United States Patent [19]

Dorey

[11] 4,019,184
[45] Apr. 19, 1977

[54] DIRECTION-FINDING METHOD AND SYSTEM

[75] Inventor: Jacques A. Dorey, Combs-la-ville, France

[73] Assignee: Office National d'Etudes et de Recherches Aerospatiales (O.N.E.R.A.), Chatillon, France

[22] Filed: Feb. 18, 1975

[21] Appl. No.: 550,481

[30] Foreign Application Priority Data

| Feb. 20, 1974 | France | 74.05808 |
| Feb. 20, 1974 | France | 74.05809 |
| Feb. 20, 1974 | France | 74.05810 |
| Feb. 20, 1974 | France | 74.05811 |
| Feb. 20, 1974 | France | 74.05812 |

[52] U.S. Cl. .................. 343/113 DE; 343/106 D; 343/100 CL
[51] Int. Cl.² .......................................... G01S 5/02
[58] Field of Search ... 343/106 D, 113 DE, 100 CL

[56] References Cited

UNITED STATES PATENTS

| 2,644,158 | 6/1953 | Thrift ........................... 343/118 |
| 3,181,159 | 4/1965 | Kramar et al. .............. 343/113 DE |
| 3,641,447 | 2/1972 | Gaines et al. ............... 343/113 DE |

*Primary Examiner*—Maynard R. Wilbur
*Assistant Examiner*—T. M. Blum
*Attorney, Agent, or Firm*—Karl F. Ross; Herbert Dubno

[57] ABSTRACT

High-frequency waves transmitted by a rotating antenna array at a ground station are intercepted by an airborne receiver for photoelectric evaluation by one or more discs whose light transmissivity, by translumination or reflection, varies periodically according to a sinusoidal law in one diametral direction while being constant in another diametral direction orthogonal thereto. The disc or discs are rotated at a speed corresponding to that of the transmitting antenna array, under the control of periodic synchronizing pulses, and are illuminated by a flux modulated by an electrical signal derived from the incoming wave, this signal containing a phase component dependent on two spatial coordinates such as elevational and azimuthal angles determining the relative position of the ground transmitter and the airborne receiver. The flux optically filtered by any such disc has a peak at a point determined by the spatial coordinates whereby the relative position can be visualized by a display device such as a vidicon camera and an associated oscilloscope screen. Parasitic components due to reflections from moving objects can be suppressed by integration of the optically filtered flux over a limited period.

42 Claims, 36 Drawing Figures

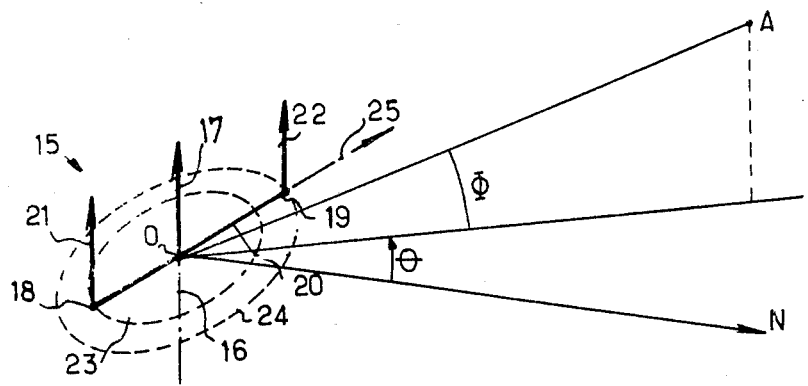
Fig.2
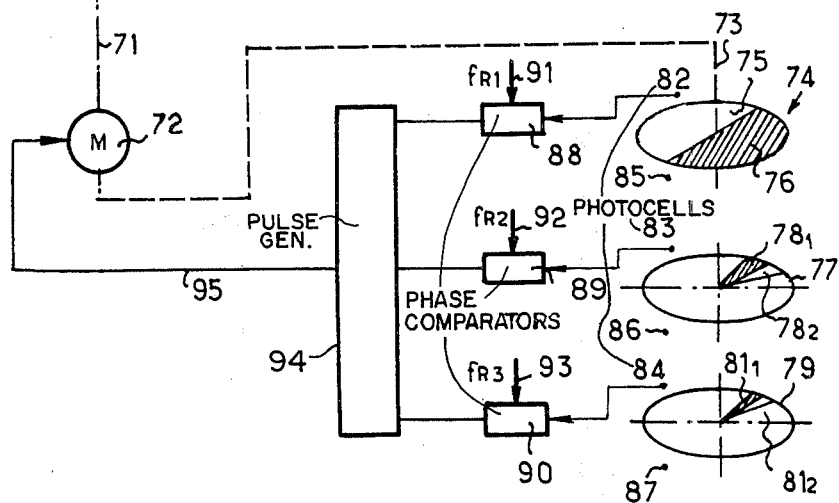
Fig.3a
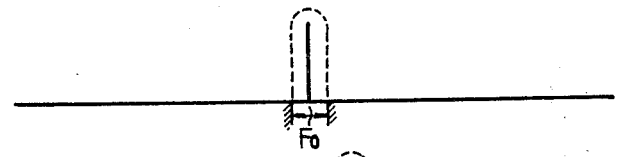
Fig.3b
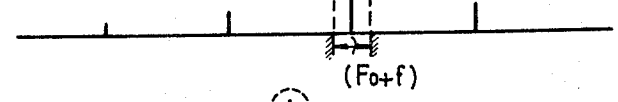
Fig.3c
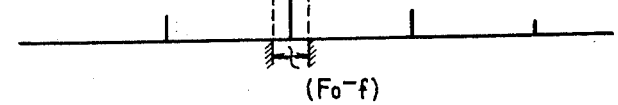
Fig.4
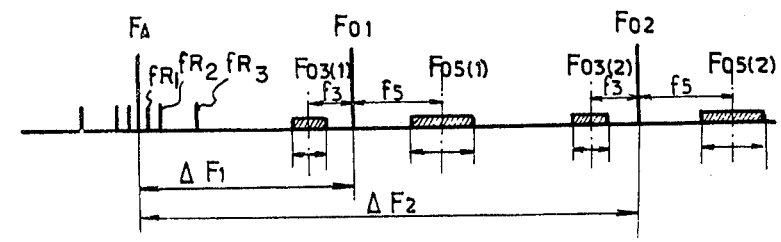

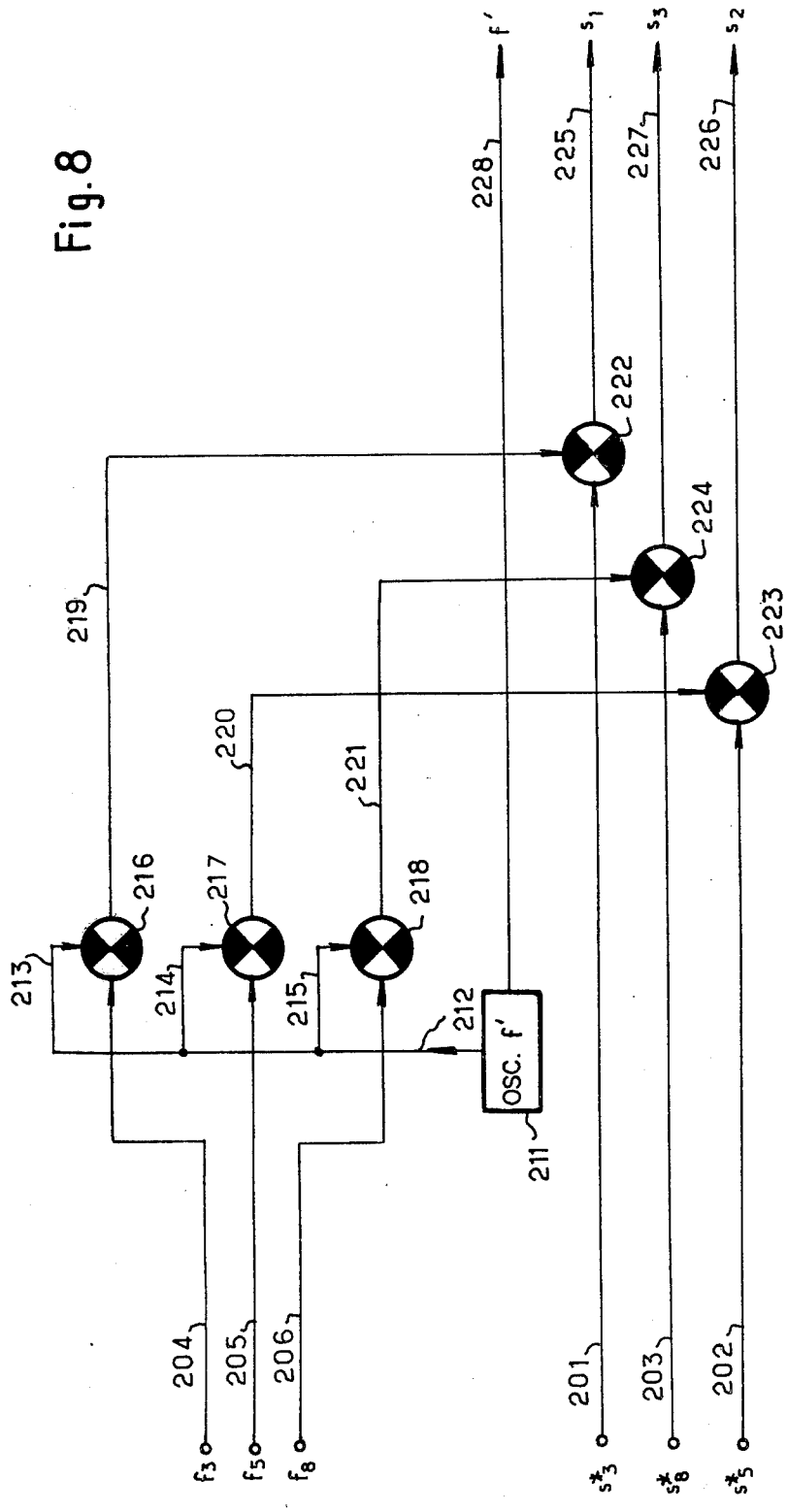

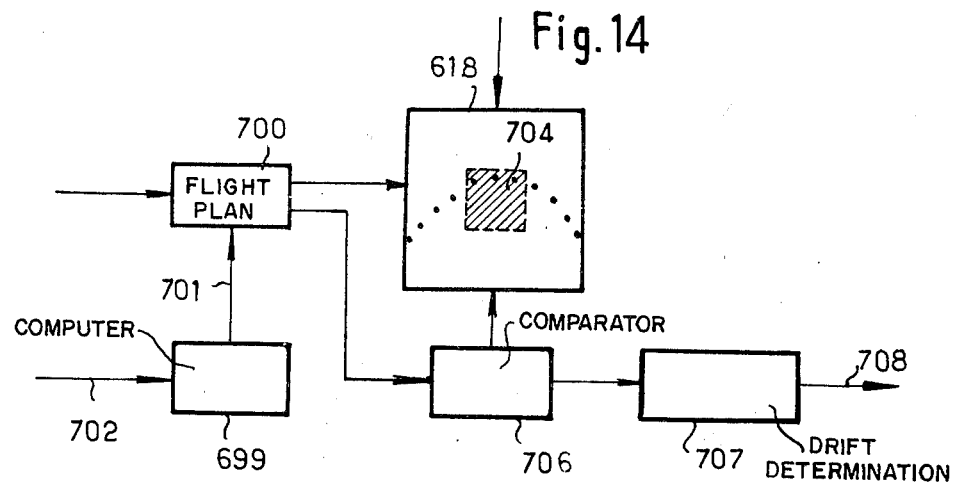
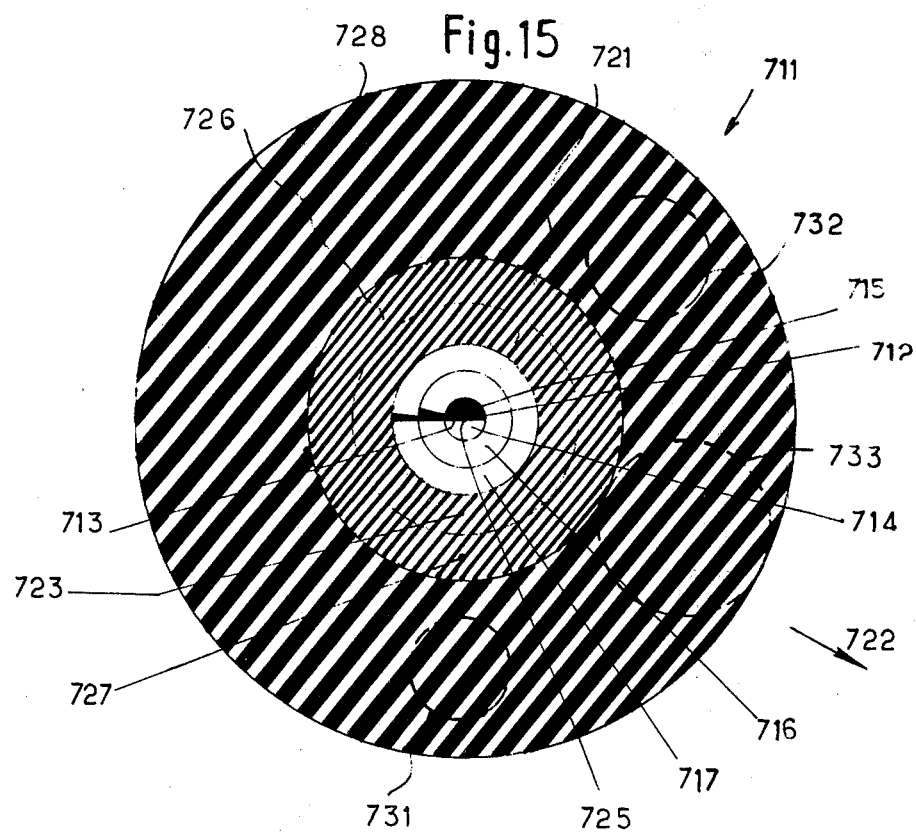

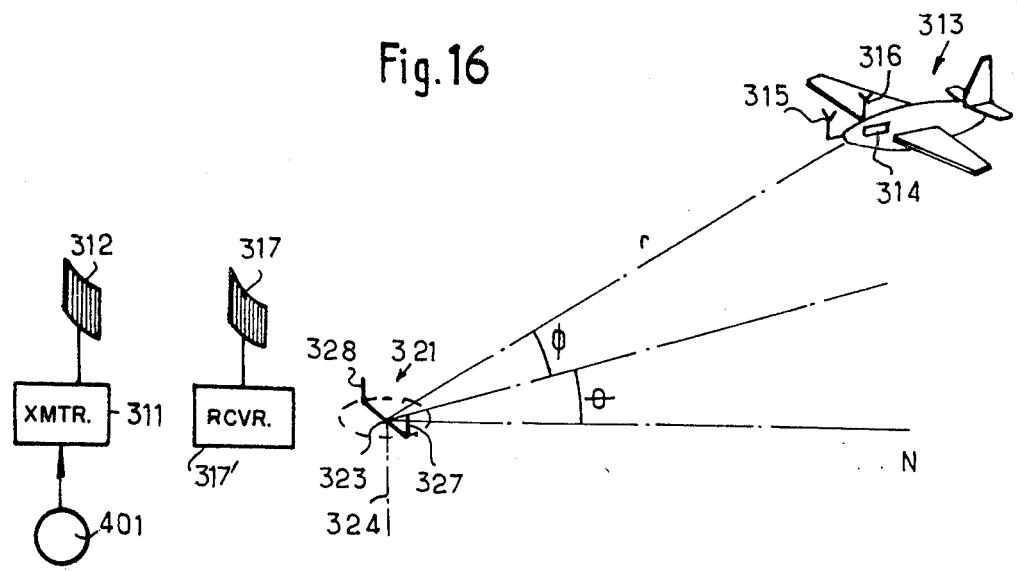
Fig.16
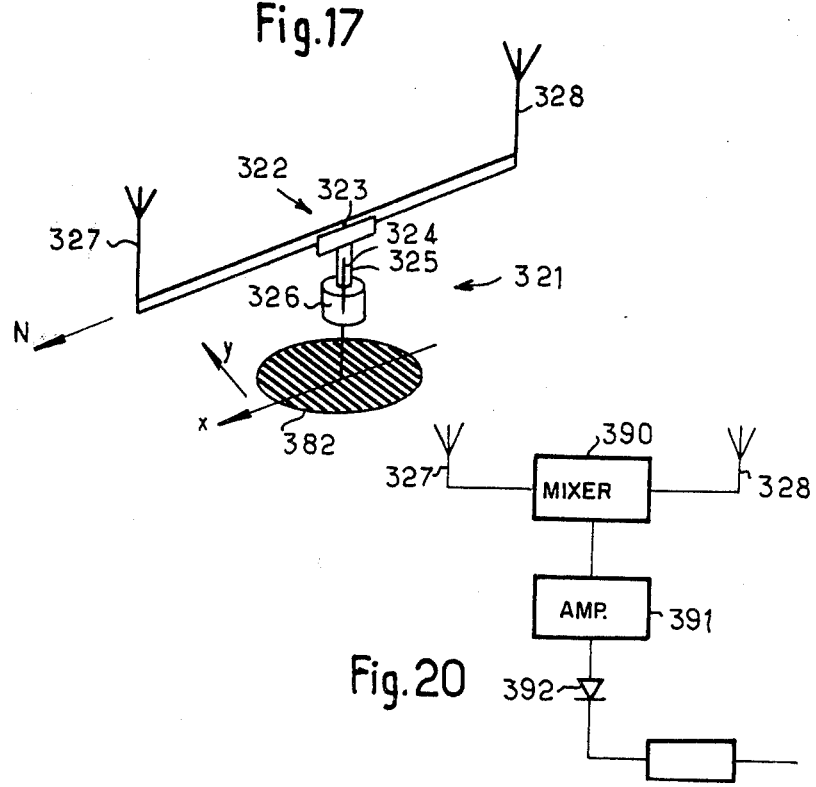
Fig.17
Fig.20

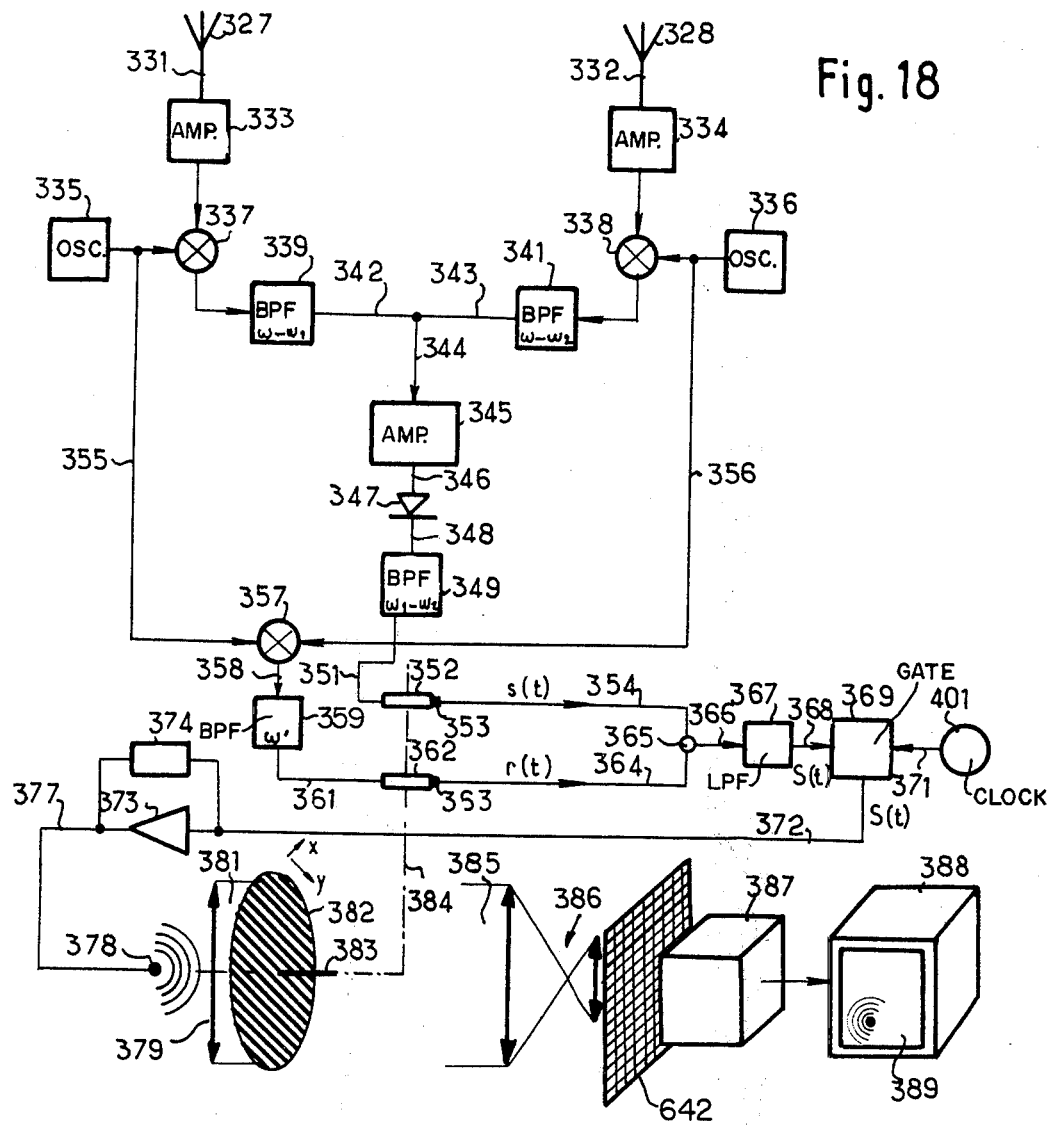

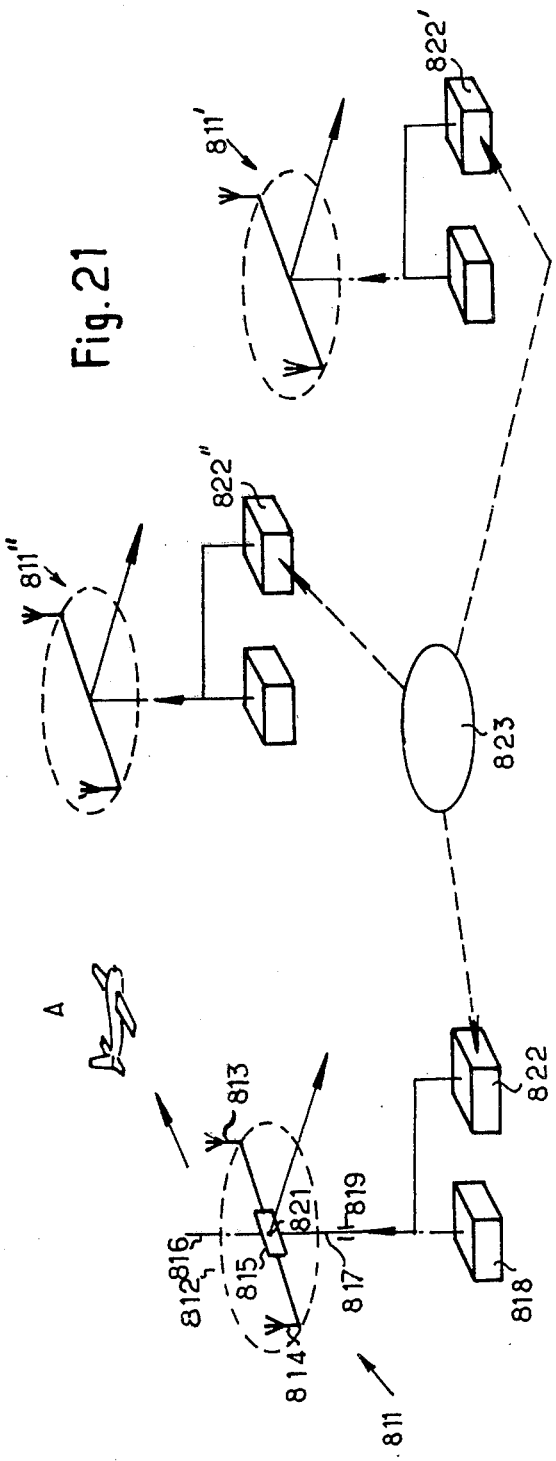
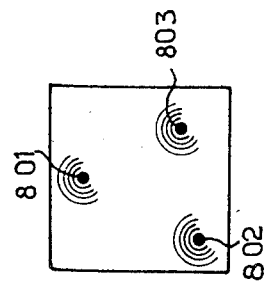
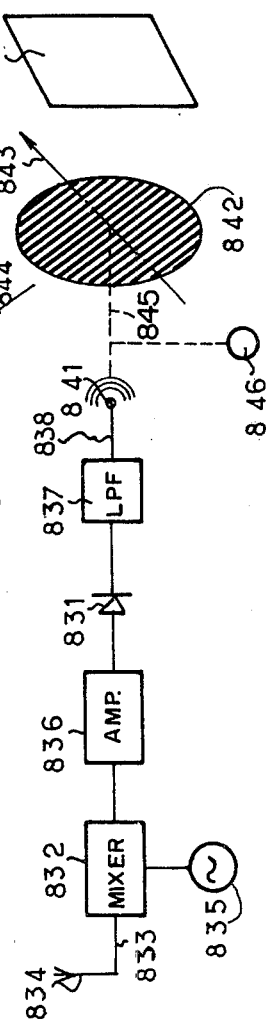

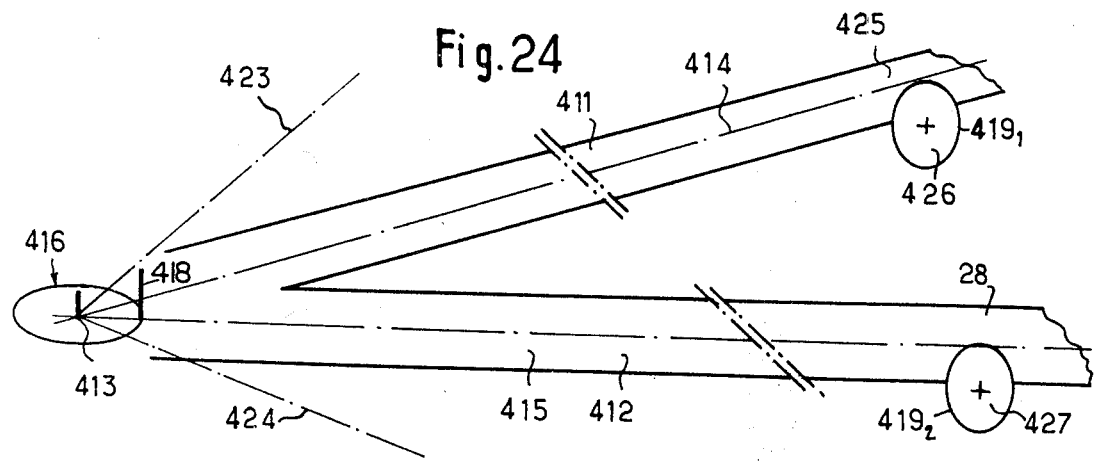
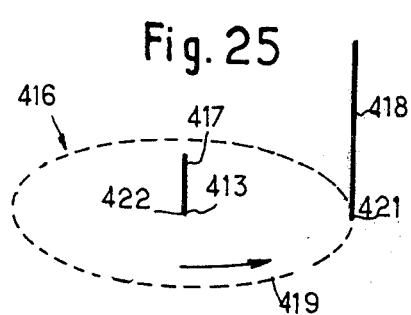
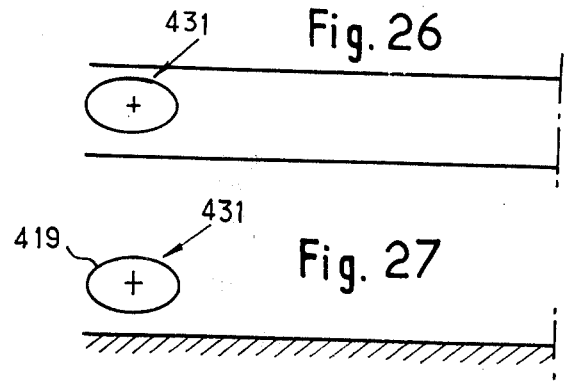
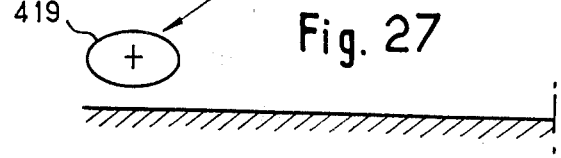
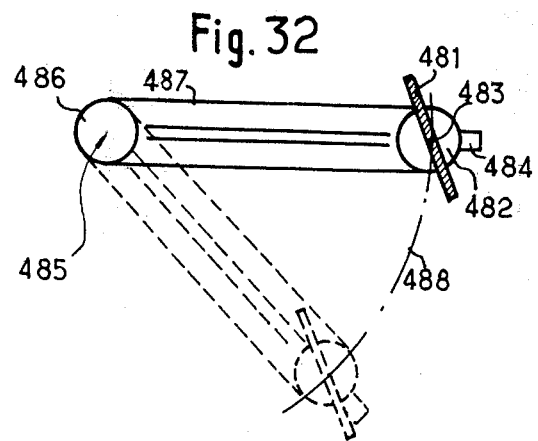

DIRECTION-FINDING METHOD AND SYSTEM

FIELD OF THE INVENTION

My present invention relates to a direction-finding method and system designed to provide information on the position of a first station, e.g. a ground installation at an airport, relative to a remote second station, located for example aboard an aircraft.

BACKGROUND OF THE INVENTION

In such direction-finding systems it is known to use rotating antenna arrays for conveying positional information, including data relating to such spatial coordinates as azimuthal and elevational angles. Heretofore, however, separate demodulators had to be used for extracting such paired coordinates at the receiving station.

OBJECT OF THE INVENTION

The object of my present invention, accordingly, is to provide a simplified way of transmitting and receiving such data, particularly in conjunction with air traffic.

SUMMARY OF THE INVENTION

In accordance with my present invention, wave energy is sent out from a transmitting device at the first station and is intercepted by a receiving device at the second station, one of these devices being subjected to a continuous periodic motion, preferably a rotation about an axis. From the intercepted wave energy a periodic signal component is derived which is generally a phase angle and depends on two spatial coordinates determined by the relative position of the two stations. A luminous flux modulated with this signal component is directed onto an optical filter, such as a rotating correlating disc, having a two-dimensional transmissivity pattern which varies periodically in one dimension. Upon a displacement of that pattern with reference to the path of the modulated flux, with a periodicity related to the period of the continuous motion of the movable transmitting or receiving device, the intensity of the flux downstream of the optical filter reaches an extreme value — namely a peak — at a location determined by the two spatial coordinates which affect the aforementioned periodic component of the received wave energy. This luminous peak can be displayed on a visual indicator such as an oscilloscope screen coupled to a vidicon camera positioned in the path of the optically filtered flux.

More particularly, the movable transmitting or receiving device is an aerial rotating about an axis, at a predetermined angular velocity which in the embodiments described hereinafter is identical with that of the correlating disc. If the rotating aerial is part of an antenna array at the receiving station, it may be directly coupled with the correlating disc. If that array is located at the transmitting station, its synchronization with the disc motion may be brought about by information contained in the transmitted wave energy. Thus, the array may comprise a pair of corotating aerials operating on frequencies that are separated from a common high-frequency carrier by low frequencies whose pulsatances are harmonically related to the angular velocity of the array; in that instance a predetermined reference position of the antenna array may be detected at the receiving station through a specific phase relationship of the modulating frequencies filtered out from the incoming wave energy.

The high frequency of transmission enables the position to be determined with a precision hitherto unknown.

Presently known systems seriously suffer from the effects of the radio-electric multi-paths created by stray echoes, whether or not these systems utilize a variation of the amplitude of the received signal as a function of time or utilize the Doppler effect.

It is true that the amplitude of the interference signals is quite often lower than that of the useful signal, but this condition is not always obtained.

The approach-and-landing assistance system according to the invention is capable of observing a large number of sources in a wide space and of obtaining an angular precision of the order of a tenth of a degree, both in elevation and in azimuth.

It enables visualizing multiple sources, stationary or mobile ones, and eliminates stray echoes even when the amplitudes of the latter are the same as, or greater than, the amplitude of the useful signal.

Not only does the invention facilitate the approach of an airplane to an airfield, and its landing on that airfield, but by enabling it to fix its position with respect to a multiplicity of beacons distributed over an area it can facilitate its navigation above that area.

The sources of radiation, or beacons, in a surface installation of my improved direction-finding system are antenna arrays with transmitting aerials performing a periodic movement along a continuous planar orbit, preferably a uniform movement along a circular path, combined with a further stationary transmitting aerial which is placed in the center of the path described by the mobile aerials.

In such an antenna array, used for the tracking of mobile objects such as aircraft, the energies radiated form on the one hand by the mobile aerials and on the other hand by the stationary aerial follow analogous laws, thus enabling the stationary radiation transmitter to act as a reference for a receiver which picks up the energy emitted by both types of radiators.

Such an installation may include a combination of several antenna arrays whose orbital planes are of different orientations.

For example, for one array the plane of the orbit of a first mobile radiator can be horizontal; the plane of the orbit of a second mobile radiator can be inclined at 45° relative to the horizontal; and the plane of the orbit of a further mobile radiator can be vertical.

A stationary or mobile radiation source may be punctiform or quasi-punctiform. Alternatively it may comprise a more or less straight conductor. In the case of a straight conductor the mobile source then describes a surface of revolution, especially a cylinder, and then the orientations of the axes of revolution, especially of cylinders, satisfy the aforestated conditions.

Another feature of my invention involves the use of a more complex aerial device which comprises several mobile radiation sources following parallel orbits, advantageously concentric circles (or concentric cylinders), preferably aligned on a single beam. There is then available a radiating assembly whose beams, emanating from various sources, carry the same characteristics resulting from the circular movement, enabling selective transmission of information emitted by these sources inasmuch as the radiating energies emitted by the sources are of the same kind but distinguished by their frequencies.

An antenna array particularly suitable for satisfactory transmission of radiant energy, in a system embodying my invention, includes an aerial with a flat body which moves along the surface of a cylinder and has a directive effect, either in transmitting or in receiving, this body being mechanically constrained to remain parallel to itself during the movement of the rotary assembly.

The invention can also be utilized for determining the position of an airfield aboard an aircraft flying in the vicinity of that airfield.

BRIEF DESCRIPTION OF THE DRAWING

These and other features of my invention will now be described with reference to the accompanying drawing in which:

FIG. 2 is a schematic view of a ground-station aerial array with its associated control circuit;

FIGS. 3a to 3c and 4 show frequency diagrams relating to the operation of the array of FIG. 2;

FIG. 8 is a circuit diagram of a different part of that receiver;

FIG. 14 is a diagram of part of the apparatus of FIG. 9;

FIG. 15 is a schematic view of a modified correlating disc;

FIG. 16 is a schematic view of an airplane approaching an airfield installation according to my invention;

FIG. 17 is a view of an antenna array forming part of that installation;

FIG. 18 is a schematic view of the installation including the array of FIG. 17;

FIGS. 19a, 19b, 19c are pulse diagrams;

FIG. 20 is a schematic detail view;

FIG. 21 is a very schematic view of an area equipped with a surface installation according to the invention;

FIG. 22 is a very schematic view of airborne equipment coacting with the installation of FIG. 21;

FIG. 23 is a schematic view of an oscilloscope screen;

FIG. 24 is a very schematic perspective view of part of a landing area with two runways;

FIG. 25 is an enlarged perspective view of an antenna array visible in FIG. 24;

FIG. 26 is a plan view of a runway equipped with another antenna array;

FIG. 27 is a corresponding elevational view;

FIG. 32 is a schematic view of a driving mechanism for an aerial of an antenna array.

SPECIFIC DESCRIPTION

Figure 1:
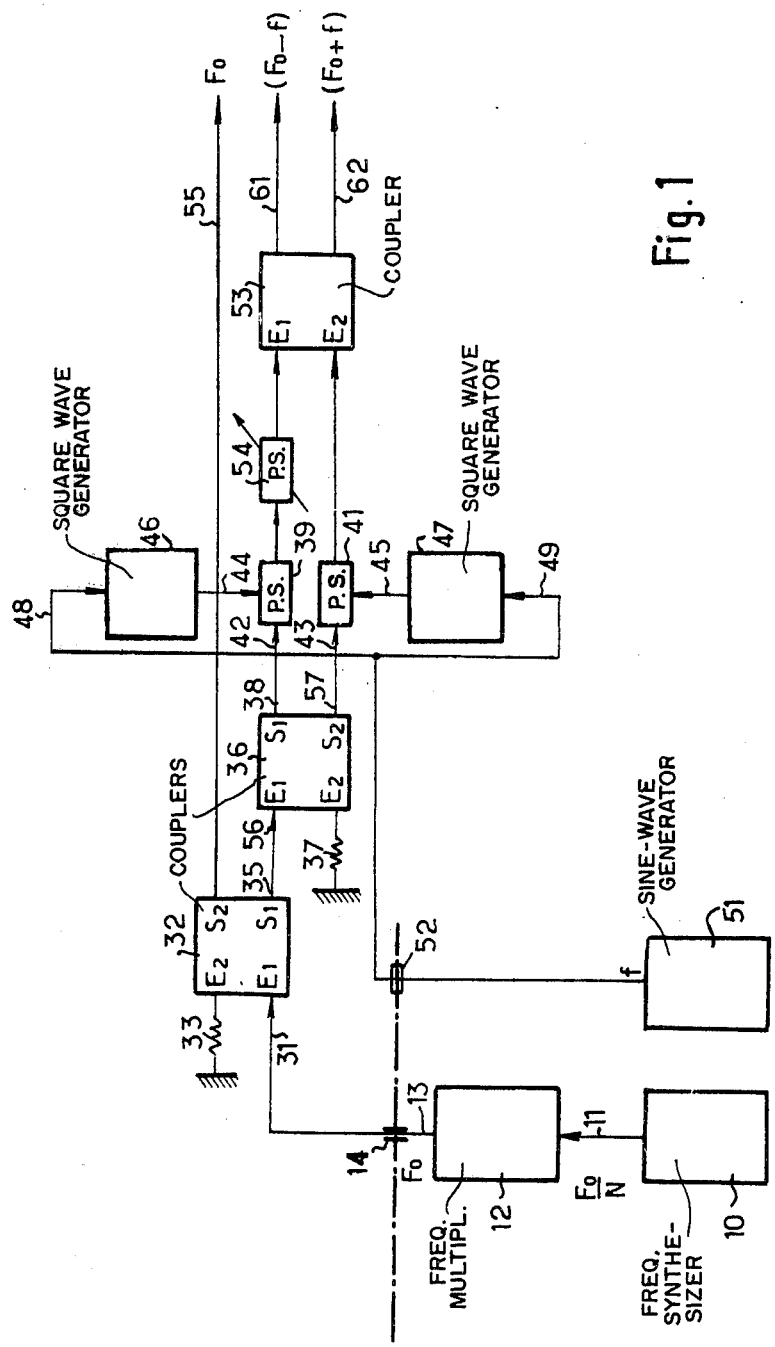
FIG. 1 is a diagram of a supply circuit for a ground-station aerial array in a system according to my invention.

A synthesizer or oscillator 10 which forms part of a ground installation, for example at an airfield, is shown in FIG. 1 and provides at its output 11 a sinusoidal signal of frequency $F_0/N$ with a precision which is of the order of $\pm 10^{-8}$. The synthesizer feeds a frequency multiplier 12 of multiplication factor equal to N which delivers at its output 13 a sinusoidal signal of frequency $F_0$. In a specific instance, given by way of example, the frequency $F_0$ is 5 gigahertz. The power at the output 13 of the frequency multiplier is of the order of 5 watts, ensuring a range of 100 km. A power output of 20 watts can be readily obtained if required. The sinusoidal signal of frequency $F_0$ is then applied through the intermediary of a suitable rotary coupling 14 to a rotating aerial assembly 15 (FIG. 2) mounted for rotation on a shaft 16 coaxial with the rotary coupling 14.

The aerial assembly 15 comprises one aerial 17 extending along the axis of shaft 16 and, at the ends 18 and 19 of a transverse arm 20 mounted for rotation about the axis of shaft 16, two further aerials 21 and 22 each parallel to the central aerial 17. The end 18 of the arm 20 describes an orbit 23 of a diameter smaller than the orbit 24 described by the other end 19 and the arm 20 is driven to rotate at a uniform rate about the axis of shaft 16.

The illustrated physically rotating aerials may be replaced by a simulated rotating array, i.e. by radiating sources whose signal rotation is obtained by electric switching as is well known per se.

An airfield will be equipped with both a reference transmission aerial (e.g. as shown at 450 in FIG. 28) transmitting sinusoidal signals, of frequency $F_A$ of the order of 5 gigahertz, and one or more antenna arrays of the type shown in FIG. 2 transmitting at a frequency $F_0$. The frequency $F_0$ will differ from the reference-aerial frequency $F_A$ by an amount $\Delta F$.

The system shown in FIG. 1 derives from the high-frequency signal $F_0$ a sinusoidal signal of frequency $(F_0 - f)$ and a sinusoidal signal of frequency $(F_0 + f)$ which can be simply obtained with reliable and light-weight components, so that they can be carried by the rotary aerial assembly 15.

The sinusoidal signal of frequency $F_0$ supplied via the rotary coupling 14 is applied to an input line 31 of a directional coupler or phase splitter 32, for example of the 3-db type.

When a signal is applied at the input E1 of such a coupler the signals present at the twin outputs S1 and S2 have the same strength, which is 3 db lower than that of the incoming signal, and the phase of the signal at the output S2 is retarded by $\pi/2$ relative to the phase common to the incoming signal and the signal present at the output S1. When the incoming signal is applied at the input E2, then it is the signal leaving via output S1 which has a phase lag of $\pi/2$ relative to both the incoming signal and to the signal leaving via output S2.

In the present instance it is the input E1 to which the signal is applied along line 31 while the input E2 is connected to ground via a load resistor 33.

The output 35 (S1) of the coupler 32 is connected at 56 to the input E1 of a directional decoupler or phase splitter 36 whose other input (E2) is grounded via a load resistor 37. The output 38 (S1) of the decoupler 36 is connected to the input of a first diode phase shifter 39, and the output 57 (S2) of the decoupler 36 is connected to a second diode phase shifter 41. The phase shifters 39 and 41 are designed to shift the phase of the signal of frequency $F_0$ which they receive at their inputs, 42 and 43 respectively, by either a predetermined angle, or the same angle increased by $\pi$, depending on a control potential (+1) or (−1) applied to their respective control inputs 44 and 45. Moreover, the phase-shift angles introduced by the respective phase shifters 39 and 41 are complementary.

These control potentials (+1) and (−1) are those of binary signals furnished by square-wave generators, 46 and 47 respectively, connected by their inputs 48 and 49 to a common generator of sinusoidal voltage 51 of frequency $f$ which forms part of the stationary, i.e. non-rotating, ground equipment. The sine-wave generator is connected to the rotating arm 20 of aerial assembly 15 through the intermediary of a mobile contact 52 simply formed by a slip ring and brush. The frequency $f$ is of the order of 1 Kilohertz.

The square-wave generator 46 supplies the binary signal $$\frac{\cos 2\pi ft}{|\cos 2\pi ft|}$$

The square-wave generator 47 supplies the binary signal $$\frac{\sin 2\pi ft}{|\sin 2\pi ft|}$$

The first phase shifter 39 is connected to the input E1 of a third directional coupler or phase splitter 53 through the intermediary of a variable phase shifter 54 which is manually or electronically controlled. The second phase shifter 41 is directly connected to the other input E2 of the directional coupler 53.

When the signal of frequency $F_0$ from the frequency multiplier 12 has magnitude W, then the output 55 (S2) of the coupler 32 carries a sinusoidal signal of frequency $F_0$ and magnitude W/2. This is the signal transmitted by the central aerial 17.

The signal of the output 35 (S1) of frequency $F_0$ and magnitude W/2 is applied to the input (E1) 56 of the decoupler 36. The output (S1) 38 of the same decoupler 36 carries a signal of frequency $F_0$ and magnitude W/4 while the other output (S2) 57 has a signal of the same frequency and the same magnitude but phase-shifted by $\pi/2$ relative to that of the output 38. When the variable phase shifter 54 is adjusted so that the phases of the voltages applied to the two inputs E1 and E2 of the directional coupler 53 are offset from each other by $\pi/2$, then the outputs 61 and 62 of the coupler 53 have sinusoidal signals which are both of magnitude W/4 and essentially consist of respective frequency bands centered on $(F_0 - f)$ and $(F_0 - f)$ on which there are superposed harmonics which, however, are sufficiently remote in frequency so as not to be troublesome. The signals of frequencies $(F_0 - f)$ and $(F_0 + f)$ are in phase with the original signal of frequency $F_0$ along line 55. These two output signals are applied to the aerials 21 and 22 respectively.

FIGS. 3a, 3b and 3c are graphs showing the respective frequency spectra of the carrier signal $F_0$ transmitted by the aerial 17, the upper sideband $F_0 + f$ transmitted by the aerial 22 and the lower sideband $F_0 - f$ transmitted by the aerial 21.

The exploitation of the signals is simple as is shown by the dotted envelopes of each of the graphs corresponding to a pass band of a respective filter. They show that the signals can readily be isolated and that the harmonics represented by the vertical lines outside the dotted-line envelope of the main signal, of smaller extent, are sufficiently remote from those of the other signals so as not to be troublesome.

Alternatively, I may apply carrier the sideband signal of frequency $F_0$ to the central aerial 17, a sideband signal of frequency $(F_0 + f_5)$ to the aerial 22 and a sideband signal $(F_0 - f_3)$ to the aerial 21, with $f_3 \neq f_5$. In this case the signals applied to the aerials 21 and 22 are advantageously both formed as described with reference to FIG. 1, with single-sideband modulation by the combination of square-wave generators and phase shifters operating on a frequency $f_3$ for one aerial and on a frequency $f_5$ for the other aerial.

The arm 20 of the aerial assembly 15, shown in FIG. 2, is wedged, keyed or otherwise secured to an output shaft 71 of a motor 72 for rotary entrainment thereby. The same motor 72 also drives another shaft 73, shown in broken lines, having keyed thereto a first disc 74 diametrally divided into a transparent zone 75 and an opaque zone 76, a second disc 77 divided into sixteen sectors $78_1$, $78_2$ etc. to $78_{16}$ which are alternately opaque and transparent, and a third disc 79 divided into 320 alternately opaque and transparent, identical sectors $81_1$, $81_2$ etc. The discs 74, 77 and 79 are angularly arranged in such a manner that the diametral plane bisecting the disc 74 into the semicircular zones 75 and 76 includes two parallel diameters delimiting adjacent sectors of the discs 77 and 79, the opaque zones $78_1$, $81_1$ immediately adjoining these latter disc diameters being situated on the same side of that diametral plane.

Each disc controls the activation of photosensitive cells 82, 83, 84 illuminated by respective light sources 85, 86, 87 positioned on the opposite sides of the respective disc, and the output voltages of these photocells are applied to phase comparators 88, 89, 90 whose other inputs 91, 92, 93 receive signals of respective frequencies of 10 Hz, 160 Hz and 3200 Hz where the angular velocity of the arm 20 is 10 revolutions per second. The phase comparison results in a control potential which is applied to the motor 72 in a circuit 95 which includes a pulse generator 94.

For reasons which will become apparent later, an airfield may be equipped with several such aerial assemblies, with the arms 20 of the various assemblies parallel and their discs 74, 77, 79 similarly keyed to the shafts. The synchronism of the movement of rotation of the arms 20 of the various aerial arrays can thus be maintained.

FIG. 4 is a spectrum of the signals emitted by an airfield equipped with the system of the present invention. The reference aerial emits a signal on a carrier frequency $F_A$ which is characteristic of the particular airfield and which is amplitude modulated with a certain number of frequencies, here three: $f_{R1}, f_{R2}, f_{R3}$, as is shown by the lines which are symmetrically disposed about the line representing carrier frequency $F_A$. It is these frequencies which are applied to the phase comparators 88, 89 and 90 shown in FIG. 2.

A first landing runway emits a carrier frequency $F_{O1}$ via the central, rotating but non-orbiting aerial 17 of the aerial assembly 15 described above.

A second runway is characterized by a frequency $F_{O2}$ emited by the central, non-orbiting aerial 17 of its own aerial assembly.

The frequencies $F_{O1}$ and $F_{O2}$ differ from the frequency $F_A$ by frequency intervals $\Delta F_1, \Delta F_2$.

With each carrier signal $F_{O1}, F_{O2}$ etc. of the non-orbiting aerials 17 of the several antenna arrays 15 of the airfield there are associated sideband signals transmitted by the corresponding rotating aerials 21 and 22 of these arrays.

The signals received at any point in space from the rotating aerials 21 and 22 are phase modulated by virtue of the rotation and cover a certain frequency range. For an aerial 22 emitting a signal of a frequency $(F_O + f_5)$, and for a radial distance of such aerial from the center of rotation equaling $20\lambda$, $\lambda$ being the corresponding wave length of the frequency emitted by the aerial, the band of frequency modulation covered is about 1250 Hz, as is shown by the hatched range centered on $F_{O5(1)}$ in FIG. 4. For the aerial 21 positioned nearer the axis 16, its orbiting radius being $12\lambda$, the mission covers a range of the order of 750 Hz as is shown by the hatched portion centered on a frequency $F_{O3(1)}$ where value is given by:

$$F_{O3(1)} = F_{O1} - f_3$$

Figure 5:
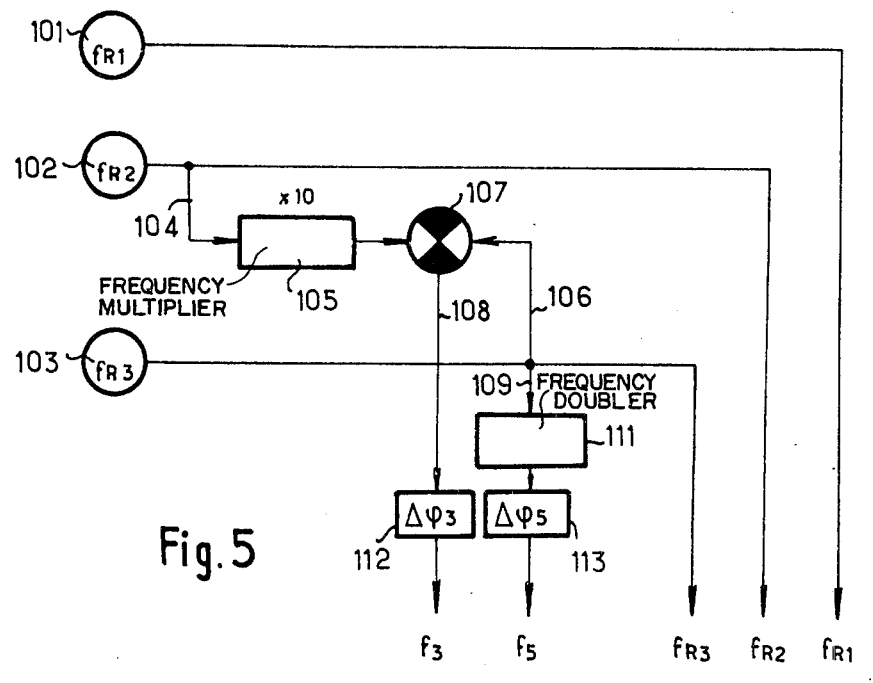
FIG. 5 is a circuit diagram of a frequency synthesizer for the system of FIG. 2.

Units 101, 102, 103 shown in FIG. 5 form part of the airfield installation and are generators of amplitude modulation of the signal $F_A$ with respective frequencies $f_{R1}, f_{R2}$b $F_{R3}$ here assumed to have the aforementioned frequencies of: 10 Hz, 160 Hz, 3200 Hz.

One output 104 of the generator 102 passes without phase shift through a frequency multiplier 105 having a multiplication factor of 10. The output of the multiplier 105 thus has a frequency of 1600 Hz. One output 106 of the generator 103 is connected to a frequency mixer 107 whose other input receives the frequency of 1600 Hz from the output of frequency multiplier 105. At the output 108 of the mixer 107 there is thus a frequency of 4800 Hz. A second output 109 of the generator 103 is connected to the input of a frequency doubler 111 to give an output of 6400 Hz. The numerical values given above, as well as others figuring elsewhere in the text, are given mentioned only by way of example and in order to facilitate the explanation.

Initially variable phase adjusters 112, 113 may be provided. These devices may be of the resistor-and-capacitor or of scaling type, and they compensate for the phase shifts introduced by the length of cables.

In FIG. 4 there is also shown the frequency $F_{O2}$ associated with a second runway and emitted by the stationary aerial 17 of the aerial assembly of this runway. Also shown are the ranges of frequencies represented by the hatched portions corresponding respectively to one and the other of the mobile aerials 21 and 22 of the array, centered on sideband frequencies $F_{O3(2)}$ and $F_{O5(2)}$.

Each runway may comprise not only an aerial assembly 15 rotating about a vertical axis but also a similar aerial assembly rotating about a horizontal axis in order to define the angle of descent. The spectrum of the signals corresponding to the runway in question then further includes a frequency corresponding to the signal emitted by the stationary aerial 17 of the axially horizontal array and two frequency ranges corresponding respectively to its mobile aerials 21 and 22.

The spectrum of signals received on board an approaching aircraft correspond to the signals transmitted by the ground station, taking into account:

1. on the one hand, that the aircraft receives not only the signals which originate directly from the radiating source on the ground but also signals derived from reflections of the radiation off stationary objects such as buildings, irregularities in ground surface, etc. or even off moving objects such as airplanes moving on the runways near the sources of radiation;
2. on the other hand, the Doppler effect resulting from movement of the plane relative to the ground station and also from the movement of any mobile signal-reflecting objects.

In practice it is found that for carrier frequencies of the order of 5 GHz, taking into account the maneuvering speed of aircraft, the range of frequencies received on board the aircraft deviates from the range of emitted frequencies by a shift of $-500$ to $+1500$ Hz. The signals received in the plane occupy relatively narrow but neighboring transmission bands.

In order to facilitate their selection, the entire field of 5 GHz is to be shifted at the receiving station, i.e. the aircraft, towards much lower frequencies.

I shall now describe the aircraft installation required to enable the crew to determine their position relative to an airfield equipped in the manner described above.

The aerial 121 of the aircraft (FIG. 6) is connected to a high-frequency amplifier 122 the output 123 of which undergoes a first modulation by a frequency changer 124 which is subjected at a further input 125 to oscillations from a first local oscillator 126. The value of the intermediate frequency MF1 applied to a first-stage I.F. amplifier 127 is thus in a range extending from 10 to 100 MHz. The I.F. amplifier 127 has a pass band which is wide enough to contain the whole spectrum of the signals transmitted by the ground installation. The frequency of the first local oscillator 126 is switchable to correspond to a function of the frequency allocated to the particular airfield with which the aircraft is in contact. The local oscillator or oscillators 126 are controlled by crystals of adequate stability, for example of the order of $10^{-7}$.

The output 128 of the first-stage I.F. amplifier 127 is split along two paths, 129 and 130.

The first path 129 comprises a frequency changer 131 which also receives the output of a second local oscillator 132 of fixed frequency to transpose the signals present on its input 129 to a region of a second intermediate frequency at its output 133. This second intermediate frequency MF2 is situated for example in the range of 100 to 500 kHz and it is applied to a second-stage I.F. amplifier 134. This first path 129, 133, 136 is designed to process the reference signal $F_A$. The pass band of the I.F. amplifier 134 thus corresponds to substantially twice the value of the highest reference frequency, i.e. $f_{R3}$, here 3200 Hz, increased by the maximum estimated value of the Doppler effect. Thus the bandwidth of the amplifier MF2 is of the order of 9 kHz.

In the described embodiment the oscillator or oscillators 126 are frequency controlled from the second intermediate frequency through the agency of a frequency discriminator 135.

If $F_{A=}$ is the average value of the tuning frequency of the second intermediate-frequency amplifier 134, then $$F_A - F_{126} - F_{132} = F_A*,$$

the frequencies $F_{126}$ and $F_{132}$ being those of the local oscillators 126 and 132 respectively.

The signals present at the output 136 of the second-stage I.F. amplifier 134 are amplitude-detected by a half-wave rectifier 137 whose output 138 of which divides into three paths each comprises a band-pass filter, 139, 140 and 141 respectively. These filters are respectively tuned to the three ground-transmitted reference frequencies $f_{R1}$, $f_{R2}$ and $f_{R3}$, here 10 Hz, 160 Hz and 3200 Hz. The filters 139, 140 and 141 have bandwidths of the order of 1 Hz and are followed by phase correctors 142, 143, 144 designed to compensate for the phase lags introduced by the respective filters 139, 140 and 141. At the outputs 145, 146, 147 of the respective phase correctors there are thus found again the reference signals but with a relative phase shift which faithfully reproduces the conditions existing at the ground transmitter station.

The filters and phase correctors may be replaced by VCO's (voltage-controlled oscillators) with error integration which act as narrow-band filters of zero phase shift.

The outputs 145, 146 and 147 are connected to a coincidence circuit 148 which supplies at its output 149 a pulse at the instant of coincidence of the phases of the signals of frequencies $f_{R1}$, $f_{R2}$ and $f_{R3}$. Since the latter are utilized for the control of the movement of the arm of the mobile antenna array from which the signals emanate, a pulse is delivered on the output 149 of the coincidence circuit every time when that rotating arm passes the reference direction, for example True North.

Figure 7:
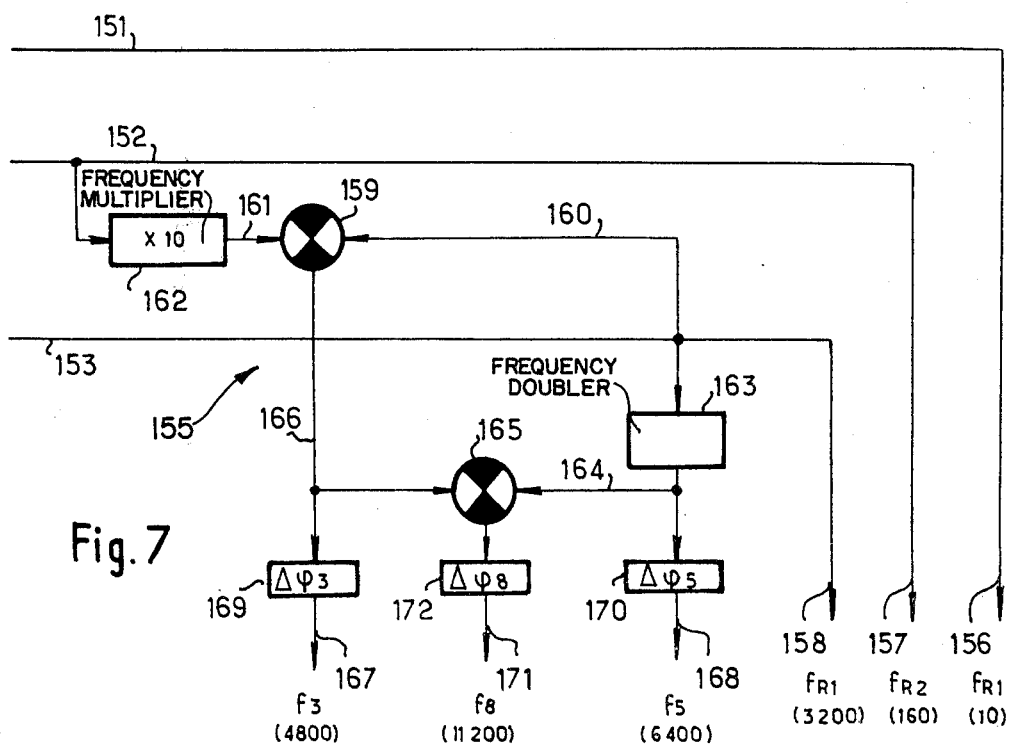
FIG. 7 is a circuit diagram of part of the receiver of FIG. 6.

Other outputs 151, 152, 153 of the phase shifters 142, 143, 144 are connected to a frequency synthesizer 155, shown in FIG. 7, which derives from the reference frequencies $f_{R1}$ (10 Hz), $f_{R2}$ (160 Hz), $f_{R3}$ (3200 Hz) the spectral lines necessary for processing the measurement signals. The circuitry of this synthesizer is similar to that shown in FIG. 5 for the ground installation.

The frequencies $f_{R1}, f_{R2}, f_{R3}$ are present at the outputs 156, 157, 158 (FIG. 7) of the synthesizer 155. A mixer 159 receives via its input 160 the frequency $f_{R3}$ (3200 Hz) from input 153, and via its input 161 the frequency 1600 Hz furnished by a tenfold multiplier 162 connected to the 160-MHz input 152. The input 153 is further connected to a frequency doubler 163 whose output 164 is connected to a mixer 165 which on the other hand is connected to the output 166 of the mixer 159. At the outputs 167 and 168 of phase correctors 169 and 170, fed respectively from units 159 and 163, there are thus found the frequencies $f_3$ of 4800 Hz and $f_5$ of 6400 Hz. The output 171 of a phase corrector 172 connected to the output of the adder 165, carries a frequency $f_8$ of 11,200 Hz. All the reference signals at the various frequencies are phase-locked.

In the aircraft there have thus been reproduced various phase-locked frequencies consisting not only of the reference frequencies $f_{R1}, f_{R2}$, and $f_{R3}$ but also of the frequencies $f_3$ and $f_5$, comprised in the signals applied to the aerials 21 and 22 respectively of the rotating array 15 of the ground station, and a further frequency $f_8$ which is the sum of the two preceding frequencies.

The second output path 130 (FIG. 6) of the first-stage I.F. amplifier 127 extends to a frequency changer 173 receiving on the other hand oscillations from a third local oscillator 174. The oscillator 174 is of adjustable frequency so as to be tunable during approach to a given airfield to the frequency of the equipment of the landing runway of that airfield.

If $E_{174}$ is the frequency of the oscillator 174, and $F_{132}$ the frequency of the oscillator 132, then the following relationship should be satisfied:

$$F_{174} - F_{132} = \Delta F_i$$

when the chosen runway is the runway $i$ on which the carrier frequency of aerial 17 is the frequency $F_{0i}$ of the spectrum of FIG. 4.

The output 175 of the frequency changer 173 extends to a third-stage I.F. amplifier 176 operating at yet another intermediate frequency MF$_3$.

With the values chosen in this example, the bandwidth of the amplifier 176 is substantially 16 kHz centered on an average value between 100 kHz and 500 kHz.

If $F_0*$ is the value chosen for the center of the pass band of the amplifier 176, the relationship $$F_{0i} - F_{126} - F_{174} = F_0*$$

should exist, $i$ being the identity of the chosen runway and $F_{174}$ being the value chosen for the frequency of the oscillator 174 associated with that runway.

The output 177 of the third-stage I.F. amplifier divides into three paths 178, 179, 181 which comprise band filters 182, 183 and 184 respectively centered on the frequencies $F_0*$, $(F_0* - f_3)$ and $(F_0* + f_5)$.

From the whole of the spectrum characterizing the signals received by the aircraft and originating from the rotating aerials of a given runway $i$:

a. The filter 183 selects the signals of a frequency range around the value $F_0*$ corresponding to the information $F_0(i)$ derived from the central, stationary aerial 17 of the runway $i$ and conveyed either directly from that aerial to the aircraft or after reflections on stationary or mobile objects, the signals being affected by the Doppler effect due to the movement of the aircraft and possible movements of reflecting obstacles:

b. the filter 182 selects the signals contained within a range of frequencies centered on the value $(F_0*-f_3)$ and corresponding to the spectrum furnished by the rotating aerial 22 which transmits the frequency $(F_0 - f_3)$; these signals, having followed a direct path or a path with one or more reflections on stationary or moving obstacles, are subject to the Doppler effect resulting from the movement of the plane or of a reflecting obstacle: and c. the filter 184 selects the signals contained in a frequency range centered on the value $(F_0* + f_5)$ corresponding to the signals derived from the rotation aerial 21, either directly or after reflection, and also affected by the Doppler effect.

A frequency mixer 185 has one input 186 connected to the output 187 of the filter 182 and a second input 188 connected to the output 189 of the filter 183. At the output 191 of the mixer 185, which effects the multiplication of the signals applied to its inputs, there appears a signal centered on the frequency $f_3$, of pulsatance $(\omega_0 - \omega_3)$, $\omega_0$ and $\omega_3$ being the pulsatances which correspond to the frequencies $F_0$ and $f_3$ respectively. This signal contains a component $\psi_3$ due to the rotation of the aerial 21. This component does not distinguish between the direct path and the reflected paths and is still affected by the Doppler effect on the various paths.

The phase angle $\alpha_3$ of this component may be expressed by $$\alpha_3 = \cos(2\pi f_3 t + \Phi_3) + \psi_3 = \left( \frac{\omega_0 r_i}{c} - \frac{\omega_3 r_j}{c} \right)$$

wherein:
$t$ is the time;
$\Phi_3$ is a phase angle referred to an origin;
$r_i$ is the length of the path of order $i$ among the various paths followed by the radiating energy between the ground transmitter the aircraft receiver; and
$r_j$ characterizes a further path of order $j$;
$c$ is the speed of light.

Similarly, a multiplication of the signals issued from the filters 183 and 184 in a frequency mixer 192 brings forth a component $\psi_5$ due to the rotation of the aerial 22. This component, which likewise does not distinguish between the direct and the reflected paths, is carried by the frequency $f_5$.

By combining the signals appearing at the output 187 of filter 182 and at the output 184 of filter 184 with the aid of a third frequency changer 194, there is created a signal centered on a frequency $(f_3 + f_5) = f_8 = 11{,}200$ Hz and carrying a component $\psi_8$.

This supplemental signal component is that which would be obtained by using in the ground-station aerial assembly a third rotating aerial of an orbital radius equal to the sum of orbital radii of the rotating aerials 21 and 22 and supplied with a frequency $(F_0 + f_3 + f_5)$, but here this component is obtained without having recourse to a large aerial with a considerable radius of gyration susceptible mechanical difficulties due to the magnitude of the accelerations to which such an aerial would be subjected.

The signals leaving the mixer 185 at 191, the signals leaving the mixer 192 at 195 and the signals leaving the mixer 194 at 196 pass through respective phase correctors 197, 198, 199 which mitigate the phase shifts introduced by the filtering operations, and especially in the third-stage I.F. amplifier 176.

The signals $s_3{}^*, s_5{}^*, s_8{}^*$ appearing at the outputs 201, 202, 203 of the phase correctors can, in association with the signals of frequency $f_3, f_5$ and $f_8$ present at the outputs 204, 205, 206 of the synthesizer 155, be processed to isolate the wanted components $\psi_3$, $\psi_5$ and $\psi_8$, as will be indicated hereinafter.

Figure 6:
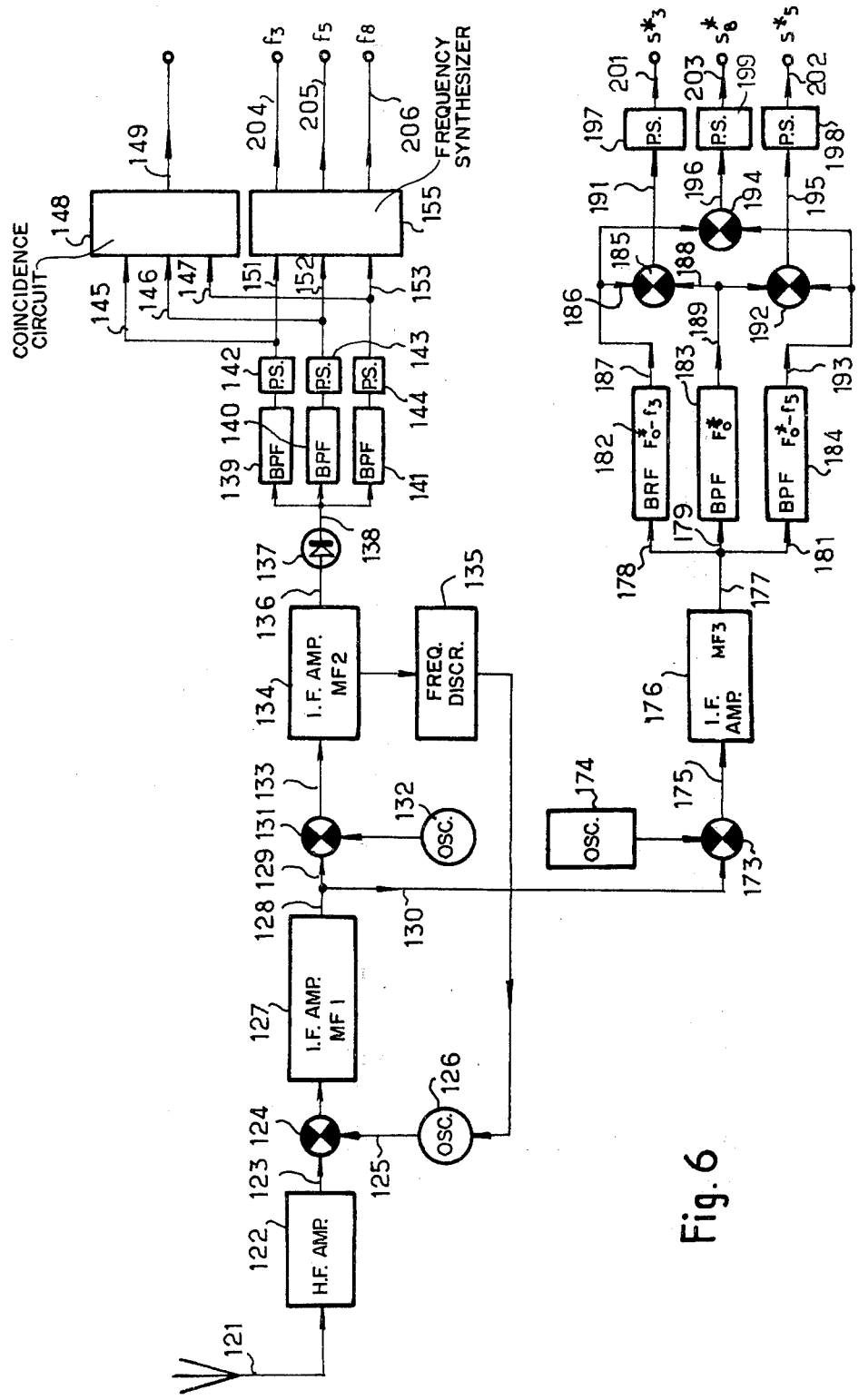
FIG. 6 is a circuit diagram of a receiver responsive to signals transmitted by the antenna array of FIG. 2.
Figure 9:
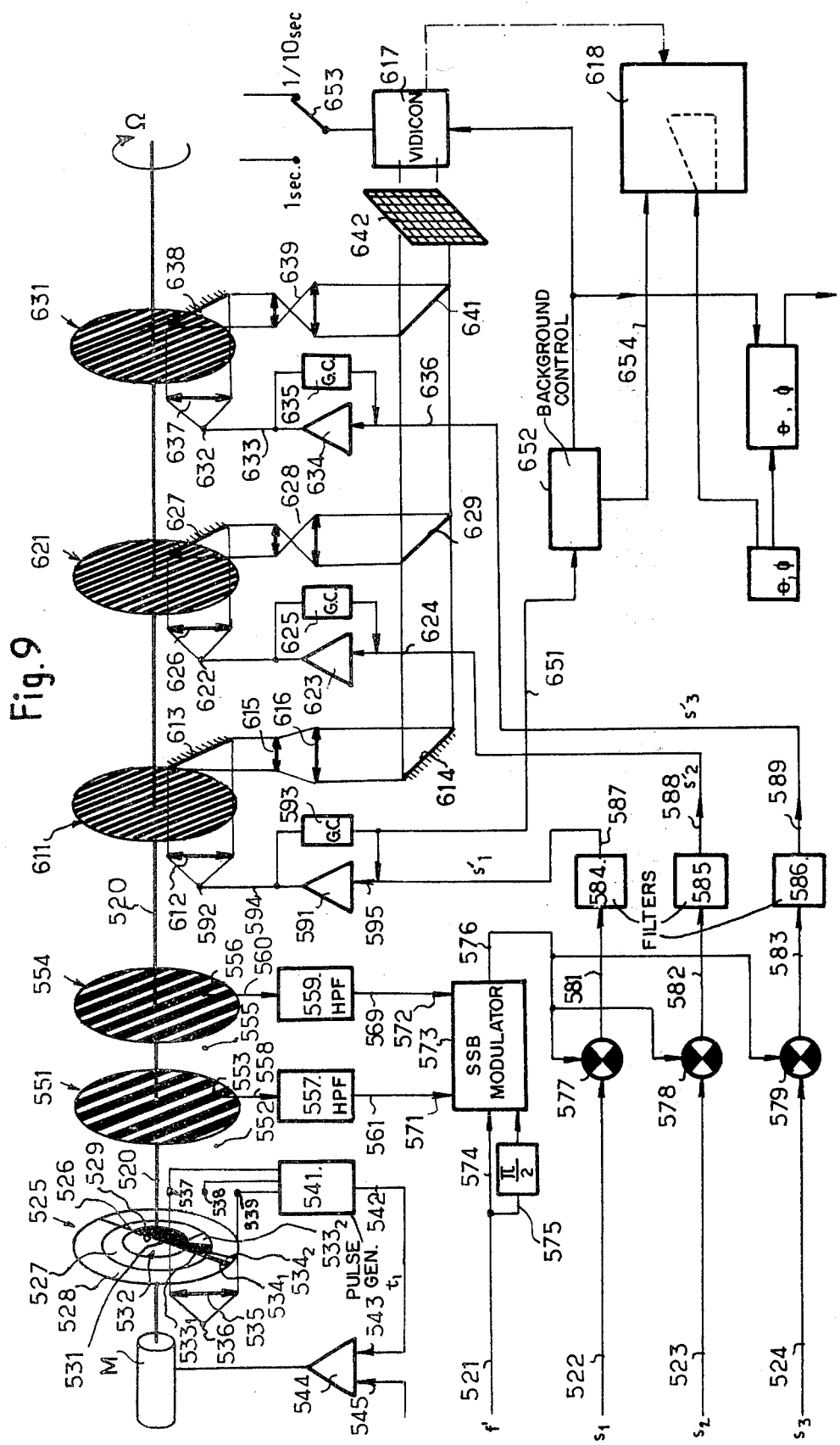
FIG. 9 is a schematic view of a processing apparatus according to the invention, including a set of correlating discs, forming part of that receiver.

In order to facilitate subsequent processing, the aircraft equipment comprises a source 211 (FIG. 8) of an auxiliary carrier frequency $f'$ which has a first output 228 extending to the processor of FIG. 9, and a second output 212 connected to the inputs 213, 214 and 215 of respective frequency changers 216, 217 and 218 whose other inputs are connected to the outputs 204, 205 and 206 of the synthesizer 155 of FIG. 6. The difference frequencies are not retained and the addition frequencies resulting from the heterodyning are applied via outputs 219, 220 and 221 to respective frequency changers 222, 223 and 224 which in turn are subtractively effective and whose and the other inputs are respectively connected to the outputs 201, 202 and 203 of the phase correctors of FIG. 6.

The characteristic components $\psi_3$, $\psi_5$ and $\psi_8$ are contained in the signals $s_1, s_2, s_3$ present at the outputs 225, 226 and 227 of mixers 222-224 and are thus carried by the common frequency $f'$.

These output signals are affected by the disturbances due to the reflected paths and also the mixing of signal components coming from one path with those coming from any other path. They satisfy the following relationships:

$$s_1 = \Sigma a_i a_j \cos\left[ \omega' t + \phi' - \frac{\omega_3 r_i}{c} + \frac{\omega_0 r_j}{c} + \psi_{i3} \right]$$

$$s_2 = \Sigma a_i a_j \cos\left[ \omega' t + \phi' - \frac{\omega_5 r_i}{c} + \frac{\omega_0 r_j}{c} + \psi_{i5} \right] \quad (1)$$

$$s_3 = \Sigma a_i a_j \cos\left[ \omega' t + \phi' - \frac{\omega_5 r_i}{c} + \frac{\omega_3 r_j}{c} + \phi_{i3} - \psi_{is} \right]$$

wherein:
$a_i$ is an amplitude associated with a track $i$;
$a_j$ is an amplitude associated with a track $j$;
$\omega'$ is the pulsatance of oscillations provided by the generator carried aboard the aircraft, here the oscillator 211;
$\phi'$ is a phase angle associated with the airborne generator;
$\omega_3$ is the angular frequency corresponding to the frequency $f_3$;
$\omega_5$ is the angular frequency or pulsatance corresponding to the frequency $f_5$;
$\omega_0$ is the angular frequency or pulsatance corresponding to the frequency $F_0$;
$r_i$ is the distance covered by the radiation on the path $i$;

$r_j$ is the distance covered by the radiation on the path $j$;

$\psi_{i3}$ is the phase shift introduced by the rotation of the aerial 21 into the radiation emanating from this aerial and arriving at the receiver via the track $i$;

$\psi_{i5}$ is the phase shift introduced by the rotation of the aerial 22 into the radiation emanating from this aerial and arriving at the receiver via the track $i$;

$c$ is again the speed of light.

The generic term $\psi$ for the phase shift is given by the equation $$\phi = \frac{2\pi R}{\lambda} \cos \Phi \cos (\Omega t - \theta) \qquad (2)$$

wherein:

$R$ is the radius of the orbit of the aerial 21 or 22 about the center of shaft 16 (FIG. 2);

$\Omega$ is the angular speed of the arm 20;

$\lambda$ is the wavelength corresponding to the frequency $F_0$;

$\Phi$ is the angle of sight or elevation of the aircraft with reference to the plane of rotation of the aerial;

$\theta$ is the azimuth or bearing.

As shown in FIG. 9, the signal $s_1$ from frequency changer 222 in FIG. 8 is fed to an input 522, the signal $s_2$ from changer 223 is fed to an input 523 and the signal $s_3$ from changer 224 is fed to an input 524 of a processor or correlating apparatus carried by the aircraft. The reference signal $f'$ (cf. FIG. 8) is present on an input 521.

The apparatus of FIG. 9 comprises a first disc 525 carried by the shaft 520 of a motor M and provided with a central circular zone 526, an intermediate annular zone 527 and a peripheral annular zone 528. A diameter 529 of the disc divides the central zone 526 into an opaque semicircle 531 and a transparent semicircle 532. For the zone 527 the daimeter 529 constitutes the boundary of an opaque sector $533_1$ adjoining to the semicircle 531 and subtending 23° 12' of arc of the zone 527, there being sixteen such equiangular sectors arranged in a sequence of alternating opaque sectors such as $533_1$ and transparent sectors $533_2$, etc. The arrangement of sectors $534_1$, $534_2$ etc. of the annular peripheral zone 528 is similar except that there are 320 of these sectors. The patterns of the disc zones 526 – 528 thus correspond to those of the discs 74, 77, 79 shown in FIG. 2.

One face of the disc 525 is lit by a beam of parallel rays provided by a lens 535 having a light source 536 placed in its focus. On the other side of the disc 525 there are placed three photo-electric transducers 537, 538, 539 which are in register with the zones 526, 527 and 528 respectively, the angular fields of the transducers being sufficiently confined so as not to be influenced by the variations in the transparency of an adjoining zone.

The output circuit of the transducers 537, 538, 539 includes a pulse generator 541 which produces at its output 542 a feedback pulse $t_1$ each time the diameter 529 passes opposite the line which joins the transducers 537, 538 and 539, causing all three transducers to indicate a change of state simultaneously. These pulses are applied to an input 543 of a servo-mechanism 544 which receives on its other input 545 the coincidence pulses, generated by circuit 148 (FIG. 6), indicative of the passage of the arm 20 of the transmitting array 15 (FIG. 2) through the direction of True North. The functioning of the motor M is thus controlled in such manner that its shaft 520 rotates always in strict synchronism with the arm 20 of the ground-station array whose drive motor 72 is controlled by the reference frequencies of 10 Hz, 160 Hz and 3200 Hz, the angular speed $\Omega$ of its shaft 16 being 10 revolutions per second. The precision of the synchronism is of the order of 0.1°.

Figure 10:
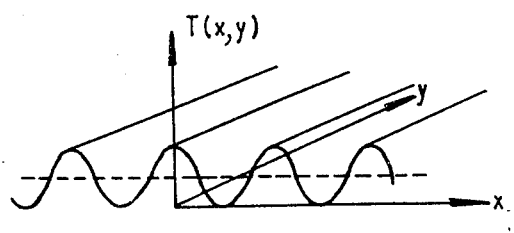
FIG. 10 is a diagram relating to the pattern of a correlating disc.

On the shaft 520 of the motor M there is keyed a second disc 551 whose light transmission by transparency or by reflection is modulated by the presence of a series of parallel stripes which, on being scanned in a direction $x$ perpendicular to the direction $y$ of these stripes, produce a sinusoidal output as schematically shown in FIG. 10. In the case of a transparent disc a photograph of interference fringes is produced with the aid of a laser emitting plane waves. There is thus obtained a law of transmissivity which is expressed by:

$$T(x,Y) = 1 + \cos\left(\frac{2\pi x}{\Lambda} + \phi_0\right) \qquad (3)$$

wherein:

$x$ is measured along a coordinate axis perpendicular to the rays;

$y$ is measured along an axis parallel to the rays;

$\Lambda$ is the spatial wavelength of the transparency pattern of the disc; and $\phi_0$ is a phase angle based on an arbitrary reference direction or origin.

The law of variation of the disc transmissivity is thus independent of $Y$, that is to say it remains the same on all straight lines transverse to the direction of the stripes.

A source of light 552 of constant intensity $I_2$ is placed opposite a face of the disc 551. On the other side of the disc, i.e. opposite the other face, there is placed a photo-electric transducer 553, for example a photodiode. The angular field of the transducer 553 is confined, generally to less than a value which corresponds to half the spatial wavelength of the pattern of disc 551.

The transducer 553 receives luminous energy $I(t)$ equaling the product of the intensity $I_2$ times the transmissivity of the dis 551 facing the transducer 553, which is given by $$T_2(t) = 1 + \cos\left[\frac{2\pi\rho}{\Lambda} \cos(\Omega t - \theta_0) + \phi_0\right] \qquad (4)$$

wherein $\rho$ is the distance of the transducer 553 from the axis of the shaft 520;

$\theta_0$ is the angle included by the axial plane containing the transducer 553 with the axial plane containing the reference direction or origin.

A comparison with equation (2), above, shows that there is similarity between on the one hand the value $2\pi\rho/\Lambda$ and on the other hand the value $2\pi R \cos \phi/\lambda$ and that there is identity of the terms relating to the angular positions.

A third disc 554 of parallel "stripes" is keyed to the shaft 520 and thus rotates at the same rate as the discs 525 and 551. The interference fringes, photographically reproduced on this disc, are identical with those carried by the disc 551 but shifted along the x axis by a length equal to one quarter of the spatial wavelength $\Lambda$. The law of transmissivity of the disc 554 is then given by $$T_3(t) = 1 + \sin\left[\frac{2\pi\rho}{\Lambda}\cos(\Omega t - \theta_0) + \theta_0\right] \quad (5)$$

A source of light 555 is placed opposite one of the faces of the disc 554 and a photo-electric transducer 556 of narrow angular field is placed opposite the other face, at the same distance from the axis 520 as is the transducer 553; the axial plane passing through the transducer 556 is the same one which passes through the transducer 553.

A first high-pass filter 557 is placed in the output circuit 558 of the transducer 553 and a second high-pass filter 559 is placed in the output circuit 560 of the transducer 556. In this way the D.C. component is eliminated and at the outputs 561 and 562 of the filters 557 and 559 there are available two quadrature signals which are respectively expressed by:

$$\left.\begin{array}{c}\cos\left[\dfrac{2\pi\rho}{\Lambda}\cos(\Omega t - \theta_0) + \theta_0\right]\\ \text{and}\\ \sin\left[\dfrac{2\pi\rho}{\Lambda}\cos(\Omega t - \theta_0) + \theta_0\right]\end{array}\right\} \quad (6)$$

These quadrature signals are applied as modulation signals to the two inputs 571 and 572 of a single-sideband amplitude modulator 573 whose other two inputs 574 and 575 which modulator receive, on the one hand, the reference signal $$f' = \cos[\omega' t + \phi']$$

and, on the other hand, a quadrature signal $$\sin[\omega' t + \phi']$$

from an extension 521 of the output 228 of oscillator 211 shown in FIG. 8, a phase shifter of $\pi/2$ being inserted in the input 575 of SSB modulator 573.

At the output 576 of the modulator 573 there is thus obtained a new reference signal which may be expressed by $$\cos\left[\omega' t + \phi' + \phi_0 + \frac{2\pi\rho}{\Lambda}\cos(\Omega t - \theta_0)\right] \quad (7)$$

or more simply:

$$\cos[(\omega' t + \phi' + \phi_0 + \phi_0)] \quad (8)$$

substituting $$\phi_0 = \frac{2\pi\rho}{\Lambda}\cos(\Omega t - \theta_0) \quad (9)$$

It is this reference signal which is applied to a first non-linear element 577 for heterodyning with the signal $s_1$ present at the input 522, to a second non-linear element 578 for heterodyning with the signal $s_2$ present at the input 523, and to a third non-linear element 579 on which there is applied on the other hand the signal $s_3$ present at the input 524. These non-linear elements may, for example, be diodes.

The signals present at the outputs 581, 582, 583 of the non-linear elements 577, 578, 579 pass through respective filters 584, 585, 586 which eliminate the harmonic $2\omega'$ therefrom. At the outputs 587, 588 and 589 of these filters there are present signals which are phase-modulated about a carrier of low frequency, but which are voluntarily shifted by an arbitrary phase modulation $\psi_0$ and an arbitrary phase angle $\phi_0$.

These signals are written:

$$\left.\begin{array}{l}s'_1 = \Sigma\Sigma_{ij} a_i a_j [\cos\phi_0 - f_{ij03}(t) + \psi_0 + \psi_{i3}]\\ s'_2 = \Sigma\Sigma_{ij} a_i a_j [\cos\phi_0 - f_{ij05}(t) + \psi_0 + \psi_{i5}]\\ s'_3 = \Sigma\Sigma_{ij} a_i a_j [\cos\phi_0 - f_{ij35}(t) + \psi_0 + \psi_{i3} - \psi_{i5}]\end{array}\right\} \quad (10)$$

In these equations the functions $f_{ij}$ represent the phase differences resulting from the radio-electric paths on the tracks $i$ and $j$ from two real sources, or from one real and one imaginary source, or from two imaginary sources, a real source being one of the aerials 17, 21 or 22 and an imaginary source being a stationary or moving reflector of radiated energy emanating from a real source.

The function $f_{ij03}$ corresponds to the pulsatances $\omega_0$ and $\omega_3$.

The function $f_{ij05}$ corresponds to the pulsatances $\omega_0$ and $\omega_5$.

The function $f_{ij35}$ corresponds to the pulsatances $\omega_3$ and $\omega_5$.

When $i$ is different from $j$, the functions $f_{ij}$ vary linearly or quadratically with time.

When identical tracks are involved, then the function $f_{ij}$ is zero.

The output 587 of filter 584 is connected to an amplifier 591 and the amplified current energizes a light source 592 whose luminous intensity is proportional to its supply current. The source 592 may for example be formed by one or more electro-luminescent diodes which provide a substantially uniform illumination in the useful range.

A gain-control device 593 is interposed between the output 594 and the input 595 of the amplifier 591, to enable the signal present at the output 594 to have a mean value of constant peak about a positive D.C. pedestal so chosen that the total signal applied to the light source 592 is never negative and also that the continuous level is close to the peak value of the signal $s'_1$.

This result will be obtained, for example, by detection of the negative-going portion of the output signal of the amplifier 591, integration so as to derive the root-mean-square value, and addition of that value to the input signal.

When the signal applied to the light source 592 is thus derived from the signal $s'_1$, given by equation (10), the luminous intensity emitted by the light source 592 is expressed by:

$$i_4 = I_4 \{1 + \Sigma\Sigma a_i a_j \cos[(\phi_0 - f(t)_{ij} + \psi_0(t) + \psi_{i3}(t)]\} \quad (11)$$

where $I_4$ is the average intensity of the source 592.

The light source 592 faces a partly transparent disc 611 keyed to the shaft 520 and having a law of transmissivity satisfying the following relationship:

$$T_4 = 1 + \cos\left[\phi_1 + \frac{2\pi\rho_1}{\Lambda_1} \cos(\Omega t - \theta_1)\right] \quad (13)$$

wherein:

$\phi_1$ is a phase angle with respect to the origin;

$\rho_1$ is the radial distance of any point considered on the disc 611 from the shaft 520;

$\theta_1$ is the polar angle of that point with respect to a reference radius of the disc 611; and $\Lambda_1$ is the spatial wavelength of the transparency pattern of the disc 611.

The light traverses the disc 611 as a beam of parallel rays provided by a lens 612 having the light source 592 at its focus.

The light intensity transmitted by transparency via the disc 611 is the product of the variables $i_4$ and $T_4$. It is written:

$$X_1 = i_4 \cdot T_4$$

$$= I_4 \left\{ 1 + \Sigma\Sigma a_i a_j \cos\left[\left(\phi_0 - f(t)_{ij} + \psi_0(t) + \psi_{i3}(t)\right)\right] \right.$$

$$+ \cos\left[\phi_1 + \frac{2\pi\rho_1}{\alpha_1} \cos(\Omega t - \theta_1)\right] + \frac{1}{2} \Sigma a_i a_j \left[\cos(\phi_0 + \phi_1 - f_{ij} + \psi_0 + \psi_{i3} + \phi_1)\right.$$

$$\left.\left. + \cos(\phi_0 - \phi_1 - f_{ij} + \psi_0 + \psi_3 - \psi_1) \right] \right\} \quad (14)$$

wherein $$\psi_1 = \frac{2\pi\rho_1}{\Lambda} \cos(\Omega t - \theta_1) \quad (15)$$

The area of the disc 611 illuminated by the beam of parallel rays issuing from the lens 612 receives a luminous flux which corresponds to the signal applied thereto by the output 594 of the amplifier 591. The light energy varying with the phase modulations resulting from the relative movements of the radiation sources and the receiver, as well as with the modulation $\psi_0$ introduced at the receiver, encounters, as a result of the rotation of the disc 611 carrying the parallel stripes, a periodically varying transparency which is a function of two parameters, i.e. the distance from the center of the disc and also the rotary speed thereof.

The similarity between, on the one hand, the variations in the transparency of the disc and, on the other hand, the variations of the flux intensity to which the disc is subjected by the varying output of its light source makes it possible to establish a correlation between the two phenomena, namely the modulation of the illuminating light beam and the changes in transmissivity resulting from the rotation of the striped disc.

In practice, as a result of this transparency illumination relationship, there exists at least one well-defined zone of the disc, punctiform or quasi-punctiform, which can be continuously traversed by the light rays in contradistinction to the remainder of the disc surface.

In this manner the disc 611, in combination with the source 592, plays a dual role, namely that of both modulator and correlator.

Mirrors 613 and 614 and lenses 615 and 616 direct the luminous flux which has passed through the disc 611 towards a detecting and integrating device which may be a photographic plate, a mosaic of photosensitive diodes, a vidicon camera, an image converter or even the retina of the human eye. Here that device has been shown as a vidicon 617.

In an interval of time T each element of the surface of the detector/integrator 617, defined by its two linear coordinates, collects an amount of energy which is proportional to:

$$\int_{t-T}^{t} x_1 \cdot dt = I_4 \cdot T \left[ 1 + \frac{1}{2} \Sigma a_i^2 \cdot \frac{1}{T} \int_{t-T}^{t} \cos(\phi_0 + \phi_1 + \psi_0 + \psi_{i3} + \psi_1) dt \right.$$

$$\left. + \frac{1}{2} \Sigma a_i^2 \cdot \frac{1}{T} \int_{t-t}^{t} \cos(\phi_0 - \phi_1 + \psi_0 + \psi_{i3} - \psi_1) dt \right] \quad (16)$$

Figure 11:
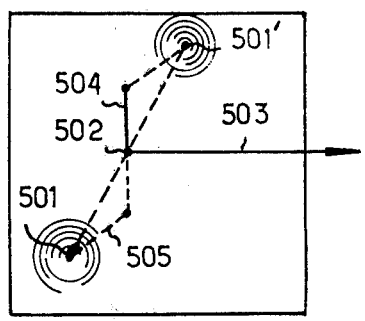
FIG. 11 is a very schematic reproduction of a display screen included in the receiver.

If the integrator is of the vidicon type, then there appears on an associated screen 618 a representation schematically shown in FIG. 11 where images 501 and 501' are symmetrically positioned with respect to the center 502 and correspond to an optical correlation occurring at two point images which are diametrically opposite and for which:

$$\psi_1 = \pm (\psi_0 + \psi_3)$$

In a preliminary study there has been determined the maximum excursion of the phase modulation $\psi$ resulting from the relative, different, positions of the aircraft with respect to the ground station when, taking into account the translation introduced by the value $\psi_0$ as a function of the stripes carried by the discs 551 and 554, one chooses the spatial wavelength $\Lambda_1$ of the stripe pattern carried by the disc 611 so that the latter furnishes the totality of the modulations on an excursion which is sufficient to comprise all the possible values of $\psi$.

If the axis of the rotating shaft 520 passes through the disc 611 at the midpoint of a stripe, be it transparent or the, two images 501 and 501' appear on the detector screen 618, associated with integrator 617 by virtue of the perfect symmetry of that disc about the axis of the shaft 520, the conditions of light transmission being identical for two diametrally opposed zones.

I eliminate this ambiguity by shifting the position of the axis of rotation of the disc 611 with respect to the pattern of the stripes.

FIG. 11 shows the two images 501 and 501' disposed respectively in the lower and in the upper portions of the screen. The midpoint 502 of the line joining the bright centers of the two images corresponds to the axis of rotation 520. A gradual shifting of the axis of rotation of shaft 520 relative to the geometrical center stripe pattern of the disc 611, while maintaining the relative positions of the discs 551 and 554, increases the intensity of one of the two images while the intensity of the other image is simultaneously diminished. By such an eccentric rotation one of the two images can be made to disappear, only the other image then remaining visible.

According to the respective phases and the area of the plane display, the image is affected by a coefficient of amplitude equal to $$\frac{1}{2} \cos(\phi_0 + \phi_1) \Sigma a_i^2 \tag{17}$$

while the other image is affected by an amplitude coefficient equal to $$\frac{1}{2} \cos(\phi_0 - \phi_1) \Sigma a_i^2 \tag{18}$$

By suitably choosing the phases $\phi_0$ and $\phi_1$ I can select either one of the images.

In one instance I may choose $\phi_0 = -\phi_1 = \pi/4$.

With regard to the value of $\phi_1$, this condition represents a positioning of the axis of rotation of shaft 520 at a location of such transparency that for $$\rho = 0$$

I obtain:

$$T_4 = 1 + \cos \pi/4;$$

it is a simple matter to adjust the phase $\phi_0$ of the reference signal by a shifting of the centers of the disc 551 and 554 by identical distances but in opposite directions.

Figure 12:
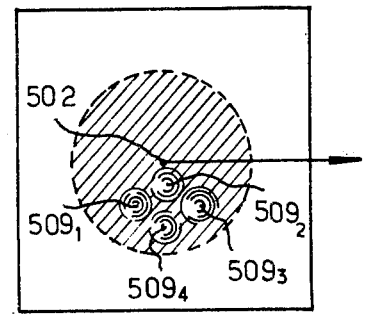
FIG. 12 is a view similar to FIG. 11.

On the integrator screen there is thus available the image shown in FIG. 12.

The law of light transmissivity defined by the spacial wavelength of both the disc 551 and the disc 554, the angular positioning of the light sources 552 and 555 relative to the axial reference plane, and the distance of the light sources 552 and 553 from the axis of shaft 520 are all chosen so that the image 501, for example, is formed in a desired area on the integrator screen.

In FIG. 11 the reference direction is shown at 503. The function $\psi_0$ appears at 504 and the function $\psi_3$ appears at 505. Since the setting of the modulator which introduces the arbitrary modulation $\psi_0$ is known from the position of the sources 552 and 555, the two responses can thus, on the one hand, be distinguished without ambiguity and, on the other hand, enable by a single translation equal to $\psi_0$ a decentering of the region of measurement (development of $\psi_3$) with reference to the axis of rotation. It is thus possible to use the same axis of rotation for a number of correlations.

On the integrator screen there appear not only the images provided by the direct paths between the ground-station aerial assembly and the aircraft but also those which correspond to one or more reflections from these paths.

To each antenna array actually present on the airfield, or to its image provided by reflection from an obstacle, corresponds one of the sets of concentric circles $509_1$, $509_2$, $509_3$ and $509_4$ each having a bright center. In a system of polar coordinates defined by the point 502 and the reference direction 503 the coordinates of the bright centers are solely defined by the phase modulation $\psi_{i3}$ corresponding to a source $i$.

The corresponding intensity of each bright center is proportional to the quantity:

$$I_i (1 + a_i^2)$$

Hence the image is formed of bright spots on a continuous background of uniform intensity.

One of the coordinates of each bright spot is directly convertible into azimuth, while the distance $\Delta \rho_i$ of the bright spots from the origin $(\rho_0, \theta_0)$ is given by:

$$\frac{2\pi \Delta \rho_i}{\Lambda'} = \frac{2\pi \Delta R_3}{\lambda_\cdot} \cos \Phi$$

wherein:

$\Lambda'$ is the spatial wavelength of the pattern carried by the disc;

$R_3$ is the radius of rotation of the aerial which transmits on the frequency $(F_0 - f_3)$;

$\lambda$ is the radiated wavelength, i.e. approximately equal to $2\pi c/\omega_0$.

$\Phi$ is the angle of elevation of the aircraft in the image $i$.

The parasitic terms with different suffixes $i, j$ in the foregoing equation (14) have disappeared in the integrator. This is due to the correctness of the Fresnel integrals, i.e.:

$$\frac{1}{T} \int_{t-T}^{t} f_{ij}(t) dt = 0$$

The integration of signal components of non-zero carrier frequency leads to a zero value.

Actually, the cancellation is not total but approaches that state as the time of integration increases.

In practice, in the problems posed by aircraft landings an integration time of 1 second is compatible with the rhythm necessary for renewed instructions up to 1 km from the transmitting array.

Within this range, an integration time of 1/10 of a second (if the array rotates at 10 revs/sec.) is sufficient to ensure an excellent elimination of the parasitic terms. A switch 653 (FIG. 9) is operable to modify the integration time of the vidicon 617.

In the embodiment which has been described, part of the angular information, i.e. $\Phi$, is known in the form of its cosine, as has been seen above.

Alternatively I may provide an optical integrator of hemispheric shape having its center in the origin 502 (of polar coordinates $\rho_O$ and $\theta_O$ and of maximum radius $\rho_M$) so that:

$$\frac{2\Delta\rho_M}{\Lambda'} = \frac{2\pi R}{\lambda} \qquad (21)$$

In that case the image is formed on the sphere at the point of coordinates $\theta$, $\Phi$, simulating a viewing of the celestial vault and of the stars.

The signals $s'_2$ and $s'_3$ are processed in a manner similar to that defined above for the signals $s'_1$. The apparatus then comprises, in association with the outputs 588 and 589 from filters 585 and 586 in FIG. 9, arrangements similar to those which have been described above in association with the output 587 from filter 584. Thus, on the shaft 520 there is keyed a disc 621 having a law of transmissivity $T_5$ which conforms to the same formula as the law of transmissivity of the disc 611, but with a spacial wavelength $\Lambda'_2$.

A source of light 622 is energized by the output of an amplifier 623 whose input 624 is connected to the output 588 delivering the signal $s'_2$. The amplifier 623 is provided with a gain-control device 625. The light source 622 is at the focus of a lens 626 to produce a parallel beam traversing the disc 621 to be reflected by a mirror 627. The light passes through an objective 628 and is directed by a semi-transparent mirror 629 towards the integrator 617. The mirror 629 is placed in the beam of rays reflected by the mirror 614 so as to pass the light coming from disc 611 and to reflect the light coming from disc 621 along the same path to the integrator 617.

A sixth disc 631 is also keyed to the shaft 520 and has a law of transmissivity $T_6$ analogous to that of the discs 611 and 621 but with a spacial wavelength $\Lambda'_3$.

One face of the disc 631 is illuminated by a source 632 connected to the output 633 of an amplifier 634 provided with a gain-control device 635, the input 636 of the amplifier being connected to the output 589 at which the signals $s'_3$ are present. The beam of parallel rays provided by a lens 637 traverses the disc 631 and is routed towards the integrator 617 through the intermediary of a mirror 638, an objective 639 and a semi-reflecting mirror blade 641.

The optical systems 615–616, 628 and 639 are such that the final images which they provide are of the same geometric dimensions. The magnification ratios are to this end inversely proportional to the relative magnitudes of the radii of rotation of the axes of the mobile aerials of the aerial assembly and also of the sum of these radii. In the Example chosen the magnification ratios are related as 3:5:8.

The objectives are also centered on the same axis, so that the centers coincide with the direction of origin defined by the modulation $\psi_O(\rho_O, \phi_O)$.

In the case where the aerial array comprises two aerials which are diametrally opposite, and when an imaginary aerial results from the beat frequency $(\psi_5 - \psi_3)$, the magnification is negative, that is to say it is accompanied by a reversal of the image in order to permit the three superpositions.

Although the apparatus could operate on a single signal $s'$, namely either $s'_1$, $s'_2$ or $s'_3$, its operation is improved by the processing of several signals, three in the present instance, whereby the secondary responses around the bright center are reduced.

Optimum balance of the three light beams is obtained by the laws of transmissivity of the semi-transparent mirrors 629 and 641.

In the event of the photosensitive surface of a vidicon being employed as the detector 617 the scan rate of the tube determines the length of the integration time.

The output potential of this tube, which is proportional to the luminous flux between two sweeps, comprises a continuous component. This may be eliminated by filtration or, alternatively, value proportional to the D.C. potential applied to the light source or sources 592, 622 or 632, as is schematically shown in FIG. 9 for the signal $s'_1$ by the connection 651 to a background-control device 652 whose output is connected to the screen 618.

In order to prevent the effects of non-linearity of sweep which would lead to distortions in the display of the image there is interposed a reference grating graduated in azimuth and in elevation, sometimes called a graticule, as shown schematically at 642. The grating is superposed, optically or electronically, on the image obtained on the photosensitive surface of the vidicon, with an intensity which is compatible with the dynamics of that surface.

Figure 13:
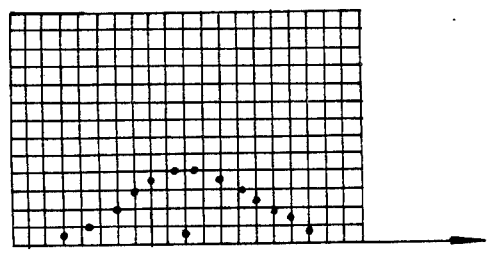
FIG. 13 shows a particular display on an oscilloscope screen.

In the case of an aircraft approaching a landing runway, the final image, displayed for example on the television screen or oscilloscope 618 of FIG. 9, appears as shown in FIG. 13. In this Figure there is shown the two-dimensional distribution of a group of points which correspond to an emitting aerial and to reflections which are present accidentally or intentionally on the contours of the landing runway or strip.

This "optronic" presentation of the radio-electric image of the electromagnetic beacons which form the antenna arrays thus provides a visual display of the whole layout which is of utmost value for the aircraft crew.

It is thus possible to compare a flight-plan course, defined by a bearing angle and a height angle, with the true position furnished by the optronic image. The simulation of the flight plan is rendered visible on the screen in the form of luminous dots, possibly of a color different from that of the "true position" picture. The comparison of the distances between the "true position" image and the flight-plan image is effected electronically by evaluation of the phase lag or lead of the signals.

It is possible to extrapolate the actual position by, for example, counting the number of lines for the divergence in height, and by using the time lag between pulses received on each line for the divergence in azimuth.

In the embodiment shown in FIG. 14 a flight plan register 700 has an input 701 connected to the flight computer 699 whose input 702 receives a signal orginating at the airfield. The display screen 618 shows the image of the runway as indicated above. The hatched field 704 shows the area of comparison furnished by a comparator 706 connected to the flight-plan register 700. The output 708 of the drift measuring device 707 has signals $\Delta\theta$ and $\Delta\Phi$ which are passed to the automatic pilot.

The extent of the field 704 may be fixed or variable.

If the area of comparison is fixed, the role of the pilot is to bring the true position into the glide path and to then ensure that the automatic pilot controls the drift, measuring $\Delta\theta$ and $\Delta\Phi$. The visual display makes it possible always to make sure that there are not several signal sources simultaneously on the glide path.

The optical-path-defining devices, such as the mirrors and lenses of the apparatus shown in FIG. 9, may be replaced by light guides utilizing optical fibers. In this way the coordinates $\theta$, cos $\Phi$ are readily converted to plane coordinates $\theta\Phi$ for the purpose of utilizing conventional planar photosensitive surfaces.

In the modification shown in FIG. 15 a single disc 711 performs the various functions of the multiple discs 525, 551, 554, 611, 621 and 631 of the preceding embodiment. The disc 711, driven to rotate about its axis at an angular velocity $\Omega$, comprises a central circular zone 712 having a diameter 713 which separates a transparent semi-circle circle 714 and an opaque semi-circle 715. A first annular zone 716 comprises 16 sectors which are alternately opaque and transparent, and a second annular zone 717 contains 320 alternately opaque and transparent sectors. The diameter 713 also forms a boundary between adjacent sectors of the annular zones 716 and 717.

A third annular zone 721 carries parallel stripes corresponding to a transmission factor varying sinusoidally along a transverse direction schematically indicated by the arrow 722. This annular zone 721 cooperates with a photo-electric cell 723 placed at a distance $\rho_4$ from the center 725. The annular zone 721 is followed by a further annular zone 726 having stripes arranged similarly to those of the zone 721, in the same direction but shifted by a quarter of a stripe. With ring 726 cooperates a transducer 727 placed at a distance $\rho_5$ from the center of disc 711. The peripheral annular zone 728 has a configuration of stripes of variable transparency according to the law which has been defined above in connection with the disc 611.

The ring 721 has a transparency pattern of spatial wavelength $\Lambda_4$ whose phase at the origin is $\phi_4$. It transmits a flux modulated by the law:

$$\phi_2 = \phi_4 + \frac{2\pi\rho_4}{\Lambda_4} \cos(\Omega t - \theta_4) \qquad (22)$$

wherein
$\rho_4$ is the distance from the center 725 of a photodiode 723 associated with the ring 721; and
$\theta_4$ is the angle included between the axial plane passing through this photodiode and the reference direction.

The ring 726 has a transparency pattern of spatial wavelength equal to $\Lambda_5$ whose phase at the origin is:

$\phi_4 + \pi/2$

It transmits a flux modulated by the law:

$$\phi_3 = \phi_4 + \frac{\pi}{2} + \frac{2\pi\rho_5}{\Lambda_5} \cos(\Omega t - \theta_5) \qquad (23)$$

wherein $\rho_5$ and $\theta_3$ have meanings analogous to those of the preceding formula.

$\rho_4, \rho_5, \Lambda_4, \Lambda_5, \theta_4, \theta_5$ are so chosen that $$\rho_5/\Lambda_5 = \rho_4/\Lambda_4 \qquad (24)$$

and that $$\theta_4 = \theta_5. \qquad (25)$$

The output signals thus supplied by photodiodes 723 and 727, respectively juxaposed with annular zones 721 and 726, are thus analogous to those which are delivered by the transducers 553 and 556 associated with the discs 551 and 554 of the embodiment shown in FIG. 9.

By single-sideband modulation in circuit 573 with the reference oscillation f1 on conductors 574 and 575, followed by mixing with signals $s_1 - s_3$ as described above, these output signals yield the signals $s'_1$, $s'_2$ and $s'_3$.

Signal $s'_1$, shifted in phase by an angle $(\phi_O + \psi_{01})$, is applied to an electric light source which is the equivlent of the light source 592 and illuminates a sector whose law of transparency has a period $\Lambda'$ equal to that of the discs 611, 621 and 631, whence $$\Lambda'_1 = \Lambda'_2 = \Lambda'_3$$

The optronic image is formed within the circle 731 defined by the excursion of the function $\psi$ of the signal $s'_1$ and centered on the function $\psi_{01}$ resulting from the single-sideband modulation effected by the modulator 573.

The signals $s'_2$ and $s'_3$ are processed in the same manner as the signals $s'_1$, by utilizing the modulation functions $\psi_{0,2}$ and $\psi_{0,3}$ obtained by two additional diodes placed at the same distance from the axis as the diode 723 but angularly shifted with respect to the latter in such manner that upon translumination of the annular zone 728 the optronic images are formed in different circles, 732 and 733 respectively.

The aforedescribed means for relative balancing and relative magnification may also be utilized for this embodiment.

With a single disc it becomes possible to process the signals emitted by a plurality of antenna arrays, their number being limited only by the ratio of useful measuring surfaces to the total surface of correlation which is that of the outer ring in the present embodiment.

The system so far described acts as a transducer of radio photons to optical photons. My invention, however, is also applicable to the processing of acoustic signals, such as are emitted by a sound source which moves along a continuous contour. The system then becomes a transducer of phonons to photons.

The invention not only enables the determination on board an aircraft of the position of the aircraft with respect to a ground station, both by determination of its coordinates in relation to the ground station at the airfield and by visual display of the ground station in a system of geographic coordinates, but also provides at an airfield both the determination of the position of an aircraft at a distance of up to a hundred kilometers and also the visual display of the aircraft.

An airfield is then equipped with a transmitter 311 (FIG. 16) the aerial 312 of which transmits high-frequency radiation. An aircraft 313 which flies in the surroundings of the airfield at a distance which may be up to one hundred kilometers carries a receiver/transmitter 314 which, upon intercepting an interrogation signal from the airfield picked up by the aerial 315 of the aircraft, transmits via an aerial 316 high-frequency response pulses which are picked up at the airfield by an aerial 317 forming part of a receiver 317'. The aerials 312 and 317 may be combined, as can be the aerials 315 and 316.

For example, in response the aircraft transmits pulses of a duration of one microsecond having a repetition frequency of the order of 1 to 10 kHz, the carrier frequency being of the order of 1 gigahertz.

The response of the aircraft is provided after a fixed delay with respect to the reception of the interrogation pulse. The carrier frequency of the response pulse transmitted by the aircraft is shifted relative to the carrier frequency of the interrogation signal emanating from the ground.

Each aircraft approaching the airfield is equipped with a receiver/transmitter and the carrier frequencies of the response pulses of the various aircraft approaching the airfield are adjacent but differ sufficiently to identify the particular aircraft.

The airfield is also equipped with an aerial array 321 (FIG. 17) which comprises an arm 322 mounted at its center 323 for rotation about an axis 324. The arm 322 is carried by a shaft 325 which is driven in a uniform rotary movement about its axis 324 by a motor 326. In the embodiment now described the axis of rotation 324 is vertical and thus the plane of rotation of the arm 322 is horizontal, but these directions may be different.

The airfield is equipped with one or more such antenna arrays.

The arm 322 carries at one end a first aerial 327 and at the opposite end a second aerial 328. Advantageously the aerials 327 and 328 are directionally effective. They are mounted on the arm 322 through the intermediary of reorienting means (e.g. as described hereinafter with reference to FIG. 32) which, despite the rotation of the shaft 325, enable them to pick up signals coming from a predetermined angular sector.

The signal received by one aerial, for example the aerial 327, from an aircraft is of the form:

$$a(t)\left[\cos \omega \left(t - \frac{r}{c}\right) + \psi(t) + \phi_1 \right] \quad (31)$$

In this formula:
- $a$ is an amplitude;
- $t$ is the time;
- $\omega$ is the angular frequency of the energy radiated by the aerial 316 of the aircraft;
- $r$ is the length of the path covered by the radiating energy from the aerial 316 to the center of rotation of the array 321;
- $c$ is the speed of light
- $\phi_1$ is an angle relative to a reference phase
- $\psi(t)$ is given by the equation $$\psi(t) = \frac{2\pi R}{\lambda} \cos. \text{cps } \Phi \cdot \cos - \theta) \quad (32)$$

wherein:
- $R$ is the radius of rotation of aerial 327;
- $\lambda$ is the wavelength corresponding to the frequency $\omega$;
- $\Phi$ is the angle of elevation of the aircraft with respect to the plane of rotation of the arm 322 of the aerial array;
- $\Omega$ is the angular velocity of the arm 322;
- $\theta$ is the azimuth of the plane relative to a reference direction passing through the center 323, for example True North.

For the aerial 328 the signal received is of the form:

$$a\left(t - \frac{r}{c}\right)\cos\left[\omega\left(t - \frac{r}{c}\right) - \psi(t) + \phi_2\right] \quad (33)$$

where $\phi_2$ is a phase relative to a reference direction.

The inversion of the signs preceding $\psi(t)$ in expressions (31) and (33) is due to the diametrally opposite position of the aerials 327 and 328 on the arm 322.

The signals picked up by the aerials 327 and 328 respectively are applied via conductors 331 and 332 (FIG. 18) to pre-amplifiers 333 and 334 carried by the arm 322. The latter also carries the local oscillators 335 and 336 of respective angular frequencies $\omega_1$ and $\omega_2$ whose phases relative to an origin are $\phi'_1$ and $\phi'_2$.

The signals issuing from a phase changer 337, whose inputs are respectively connected to the pre-amplifier 333 and to the local oscillator 335, pass through a band-pass filter 339 centered on the difference frequency $\omega - \omega_1$; similarly, the signals issuing from a phase mixer 338, whose inputs are respectively connected to the pre-amplifier 334 and the local oscillator 336, pass through a band-pass filter 341 centered on the difference frequency $\omega - \omega_2$. The outputs 342 and 343 of the filters 339 and 341 are jointly connected to the input 344 of an intermediate-frequency amplifier 345. The amplified signals resulting from the mixing of the oscillations passed by the filters 339 and 341 are jointly applied via the output 346 of the I.F. amplifier 345 to a nonlinear element, for example a diode 347, which produces the product thereof. The resulting signals pass through a filter 349 which is centered on an angular frequency $$\omega_1 - \omega_2 = \omega'$$

and whose pass band has a width sufficient to take into account the maximum excursion of the phase modulation coming from either of the aerials 327 and 328 and also of the amplitude spectrum resulting from the pulse character of the received signals.

For example, if $\omega_1$ and $\omega_2$ are given such values that $$\omega_1 - \omega_2 = 2 \text{ MHz}$$

the filter 349 will be centered on 2 MHz and its bandwidth will be 1 MHz.

The output 351 of the filter 349 is connected to a conductive slip ring 352 which rotates with the shaft 325 and cooperates with a shoe or brush 353 which is at the end of a conductor 354 forming part of the non-rotating assembly. The signal present on the conductor 354, resulting from the quadratic detection performed by the element 347 and the filtration by the filter 349, is a voltage $s(t)$ of the form:

$$s(t) = \Sigma_i a_i^2 \left(t - \frac{r}{c}\right) \cos \omega' t + \phi' + \phi_1 - \phi_2 + 2\phi_i(t) \quad (34)$$

The suffix $i$ again corresponds to a path $i$ in the event that the radiation transmitted by the aircraft arrives at the antenna array along a multiplicty of paths, the transmission then being "multi-path."

Outputs 355 and 356 of the local oscillators 335 and 336 are furthermore connected to a frequency changer 357 whose output 358 extends to a filter 359 of narrow pass band centered on the frequency $\omega'$. The filter 359 is connected by a conductor 361 to a slip ring, 362, forming part of the rotating shaft 325 (FIG. 17), and with which cooperates a shoe or brush 363. The signal $r(t)$ present at the conductor 364 connected to the shoe 363 is of the form:

$$r(t) = \cos (\omega' t + \phi') \quad (35)$$

The signals $s(t)$ and $r(t)$ are multiplied in a non-linear element 365, such as a diode, having its output 366 connected to a low-pass filter 367 which eliminates therefrom the harmonic $2\omega'$. The signal at the output of the low-pass filter 367 is of the form:

$$S(t) = \Sigma_i a_i^2 \cos [\phi_1 - \phi_2 + 2\phi_i(t)] \quad (36)$$

Now that the filter 367 has eliminated the harmonic frequency $2\omega'$, the signal $S(t)$ is a phase-modulated signal superimposed on a null frequency.

After having passed through a gate device 369 controlled from a source of clock pulses 401 by way of an input 371, the signal $S(t)$ is then applied via a conductor 372 to an amplifier 373 comprising a gain-control device 374 on account of which the signal present at the output of the amplifier 373 has a constant mean peak amplitude of a chosen value which in the following will be considered as being unity (1).

The amplified current present at the output 377 of the amplifier 373 serves to feed an electro-luminescent diode 378 which supplies a luminous flux proportional to the intensity of the supply current. Through the intervention of the gain-control device 374, the potential applied to the diode 378 is never negative and the continuous level is not too high compared with the mean square value of the signal.

The electro-luminescent diode 378 is at the focus of a lens 379 which provides a beam 381 of parallel rays directed towards a disc 382 mounted for rotation about an axis 383. The disc 382 is similar to the discs 611, 621, 631 of FIG. 9, its transparency varying along a direction schematically shown by the arrow x while being constant in the perpendicular direction schematically shown by the arrow y. It thus has a succession of parallel stripes obtainable from interference fringes of a monochromatic light. The transparency $T'$ of the disc 382 varies according to the expression:

$$T'(t, \rho_0, \theta_0) = 1 + \cos\left[\phi_0 + \frac{2\pi\rho_0}{\Lambda} \cos(\Omega t - \theta_0)\right] \quad (37)$$

wherein:
$\phi$ is a phase at a selected origin;
$\rho_0$ and $\theta_0$ are the polar coordinates of a point of the disc;
$\Lambda$ is the spatial wavelength corresponding to the sinusoidal transparency pattern;
$\Omega$ is the angular speed of the disc, equal to the angular speed of the arm 322 (by virture of the mechanical link 384 established between the shaft 325 and the shaft 383 which carries the disc 382).

When $I$ is the light intensity furnished by the electro-luminescent diode 378 and x is the quantity of light coming from that diode after passage through the disc 382, then:

$$X = I \cdot T' \quad (38)$$

Now:

$$I = 1 + S(t) \quad (39)$$

Therefore:

$$X = [1 + S(t)]\left\{1 + \cos\left[\phi_0 + \frac{2\pi\rho_0}{\Lambda} \cos(\Omega t - \theta_0)\right]\right\} \quad (40)$$

This formula gives the quantity of light present at one point downstream of the disc 382 defined by polar coordinates $\rho_0, \theta_0$.

The light of the beam 385 transmitted through the disc 382 is projected by an optical device 386 on a detector/integrator as symbolized by a vidicon 387 preceded, as in FIG. 9, by a grating 642. The vidicon is connected to a visual display indicator represented by an oscilloscope 388 with a screen 389.

The product of the two binomials of the formula (40) is the sum of the four terms which are successively written hereunder:

1) $1$ \hfill (41)

2) $\cos\left[\phi_0 + \frac{2\pi\rho_0}{\Lambda} \cos(\Omega t - \theta_0)\right]$ \hfill (42)

3) $S(t)$ \hfill (43)

4) $S(t) \cos\left[\phi_0 + \frac{2\pi\rho_0}{\Lambda} \cos(\Omega t - \theta_0)\right]$ \hfill (44)

Upon averaging by the integrator 387 during a time lasting from $(t-T)$ to $t$:
1. the integration of the first term "1" gives T;
2. the integration of the second term leads to a zero result since this is the integration of a sinusoidal signal of periodicity t whose mean value must be zero;
3. the same applies to the integration of the third term which, according to equation (36), is also a sinusoid of periodicity t whose mean value must be zero.

Thus the result of the integration is:

$$J = T + \int_{t-T}^{t} a^2 \cos[\phi_1 - \phi_2 + 2\psi(t)] \cos[\phi_0 + \phi_0(t)] \, dt \quad (45)$$

wherein $$\phi_0(t) = \frac{2\pi\rho_0}{\Lambda} \cos(\Omega t - \theta_0) \quad (46)$$

Equation (45) can be broken down thus:

$$J = T + \frac{1}{2} \int_{t-T}^{t} a^2 \cos[\phi_1 - \phi_2 - \phi_0 + 2\phi - \phi_0] \, dt \quad (47)$$

$$+ \frac{1}{2} \int_{t-T}^{t} a^2 \cos[\phi_1 - \phi_2 + \phi + 2\phi + \phi_0] \, dt$$

The position of the point of the disc 385 determined by $\rho_0$ and $\theta_0$ for which the rotation of the disc illuminated by the light emanating from the electroluminescent diode 378 will be substantially devoid of time modulation is that for which $\rho_0$ and $\theta_0$ are the solutions of one or the other of the following two groups of equations:

$$\begin{cases} \frac{2\pi\rho_0}{\Lambda} = 2 \cdot \frac{2\pi R}{\lambda} \cos \Phi \\ \theta_0 = \theta \end{cases} \quad (48)$$

$$\begin{cases} \frac{2\pi\rho_0}{\Lambda} = 2 \cdot \frac{2\pi R}{\lambda} \cos \Phi \\ \theta_0 = \theta + \pi \end{cases} \quad (49)$$

It is only at the point of polar coordinates $\rho_0, \theta_0$ and at the point of polar coordinates $\rho_0, (\theta_0+\pi)$ that the variation of the transparency of the disc follows the variation of the flux, establishing a correlation, while at any other point this is not so. Thus the disc 382 provides an infinite number of modulations with respect to which it is impossible to effect a correlation of the phase modulations of the received signals, after processing.

For the solution of equation (48) the intensity of the image visible on the screen 389, for a time T of integration, will have the value given by the formula:

$$J(\rho_0, \theta_0) = T + \frac{1}{2} \int_{t-T}^{t} a^2(t) \cos(\phi_1 - \phi_2 - \phi_0) \, dt \quad (50)$$

The latter may be written:

$$J(\rho_0, \theta_0) = T + \frac{1}{2} \cos(\phi_1 - \phi_2 - \phi_0) \int_{t-T}^{t} a^2(t) \, dt \quad (51)$$

Let W be the value of the integral in equation (51) which represents the energy of the signal during the time T; this yields, in addition to a constant, the value:

$$J(\rho_0, \theta_0) = T + \tfrac{1}{2}\cos(\phi_1-\phi_2-\phi_0)W \quad (52)$$

For the other solution, corresponding to equation (49), the corresponding value is:

$$J(\rho_0, \theta_0+\pi) = T + \tfrac{1}{2}\cos(\phi_1-\phi_2+\phi_0)W \quad (53)$$

The desired visualization is thus obtained whatever the nature of the signal transmitted by the aircraft, whether this is a modulated or an unmodulated signal, including a pulsed signal; the only condition to be observed is that the number of pulses transmitted by the aircraft during one revolution of the arm of the aerial device should be sufficient for proper integration.

The ambiguity of the solutions is resolved in favor of the visualization corresponding to the signal of formula (52) by making it maximal while the other is minimal, this being achieved by so choosing $\phi_1$, $\phi_2$ and $\phi_0$, that $$\cos(\phi_1-\phi_2-\phi_0) = 1 \quad (54)$$

that is to say:

$$\phi_1-\phi_2-\phi_0 = 0 \quad \text{or:} \quad (55)$$

$$\phi_0 = \phi_1-\phi_2 \quad (56)$$

The second signal is minimzed by making $$\cos(\phi_1-\phi_2+\phi_0) = 0 \quad (57)$$

that is to say:

$$\phi_1-\phi_2+\phi_0 = \pi/2 \quad (58)$$

One deduces therefrom:

$$2\phi_0 = \pi/2$$

that is:

$$\phi_0 = \pi/4 \quad (59)$$

and hence:

$$\phi_1 - \phi_2 = \pi/4 \quad (60)$$

The condition (60) is fulfilled by so dimensioning the aerial-supporting sections of the rotating arm 322 that their radio-electric lengths differ by an amount which introduces into the signals passing through them a phase shift of $\pi$.

The keying of the disc 382 on the shaft 383 is such that the direction y of the "parallel stripes" is perpendicular to the direction of the rotating arm when the latter is oriented along the direction of True North (FIG. 17).

The condition (59) is met by suitably positioning the axis of rotation 383 with respect to the stripes carried by the disc 382.

Such a system can operate satisfactorily with omni-directional aerials 327 and 328. It enables aircraft whose transmissions are received by arrays of rotating aerials 327 and 328 to be visually displayed on the screen 389 at the airfield.

The apparatus also makes it possible to select a particular aircraft for observation.

The clock 401 serving the gate device 369 controls the pulses applied by the transmitter 311 to the aerial 312 (FIG. 16). These interrogation pulses are shown in FIG. 19a.

The response pulses picked up by the ground-station receiver are shown in thick solid lines for an aircraft 1 and by thin outlines for an aircraft 2, at a greater distance, in FIG. 19b. The interval between an interrogation pulse and a response comprises the two-way transit time to which is added a systematic delay introduced by the aircraft equipment and peculiar to it. When the gate device 369 is open during the times schmetically shown by the solid-line crenellations of FIG. 19c centered on the time following the interrogation pulse, only the signals arriving from the aircraft 1 are processed, the period of repetition of the gating pulses being equal to that of the interrogation pulses.

If the gate 369 opens for an interval centered on a time $\tau'$, as is shown in dotted lines in FIG. 19c, then only the signals arriving from the aircraft 2, to the exclusion of those from aircraft 1, are received.

In this manner the airfield can assume control over aircraft whose distances from the airfield ranges between two predetermined values.

Leaving the gate 369 permanently open makes it possible to obtain on the screen 389 a visual observation of all the aircraft in the vicinity of the airfield, up to a distance corresponding to the limit of the range of transmission, optionally in a specific angular sector.

For each aircraft the apparatus enables its azimuth and its angle of elevation $\phi$ to be determined. These data are transmitted by the airfield to the interested aircraft, for example through the intermediary of the system known by the name of "Data Link."

In another embodiment illustrated in FIG. 20, the signals received at the aerials 327 and 328 are added in a mixer 390 and then amplified by an amplifier 391. The signal present at the output of the amplifier is subjected to a non-linear operation, for example in a diode 392, whereby in the case of an aerial array comprising a central aerial and a single orbiting aerial there appears a signal of the following kind:

$$a^2 \cos [\phi_1 - \phi_2 + \psi(t)] \quad (61)$$

In the case when the ground-station aerial array comprises two orbiting aerials of radii $R_1$ and $R_2$, possibly with $R_1 = -R_2$ as in the array shown in FIG. 17, the signal has the form:

$$a^2 \cos [\phi_1 - \phi_2 + \psi_1(t) - \psi_2(t)] \quad (62)$$

In the case of an aerial array comprising a central stationary aerial and two diametrally opposite orbiting aerials at different distances from the axis of rotation, the signals obtained are of the form:

$$s_1 = a^2 \cos [\phi_1 - \phi_2 + \psi_1(t)]$$

$$s_2 = a^2 \cos [\phi_3 - \phi_2 + \psi_3(t)]$$

$$s_3 = a^2 \cos [\phi_3 - \phi_1 + \psi_3(t) - \psi(t)] \quad (63)$$

in the case where the signals picked up by the stationary aerial and one moving aerial are first mixed according to signal $s_1$, the signals picked up by the stationary aerial and the other moving aerial are mixed according to the signal $s_2$ and the signals resulting from this mixing are combined according to the signal $s_2$.

Interrogation pulses could also be transmitted by every aircraft, each one of them possessing a code peculiar to it. In that case, the ground station at the airfield comprises a receiver suitable for triggering a response transmission via an antenna array of the kind described above. Consequently, upon receipt of the various interrogation pulses, the ground-station array transmits pulses which are phase modulated by the rotation of the array. Each aircraft has a gate device which opens only upon reception of the signals transmitted by the rotary aerial array which correspond to the code peculiar to the aircraft. The phase-modulated signals received by the aircraft in response to its interrogation are processed by a device which is identical with that which has been described above, that is to say which comprises pre-amplifiers mixers and a modulator correlator device followed by an integrator. On the screen of the oscilloscope aboard the aircraft there appears the visualization of the rotary array on the ground from which it is possible to determine the angular-position parameters pertaining to this array. The distance is obtained from the time lag between the interrogation-pulse transmission from the aircraft and the reception of the ground-transmitted, phase-modulated response signals carrying the identification code of this particular aircraft.

The equipment which has been described can also be used as an aid to navigation above a ground area. The area above which aerial navigation is to be facilitated comprises transmitters or beacons 811, 811', 811'', etc. distributed at distances from one another which may be of the order of 150 km. Each transmitter comprises an antenna array 812 formed of two aerials, for example omni-directional quarter-wave aerials 813 and 814, carried at the ends of an arm 815 mounted for rotation at its center 816 about a vertical axis 817 as shown in FIG. 21.

A U.H.F. generator 818 having a power of the order of one watt to a few tens of watts is connected to the aerials 813 and 814 through the intermediary of a rotating coupling 819 and a directional coupler 821 which distributes the power equally between the aerials 813 and 814. The arm 815 is rotatively driven by a motor 822.

The operation of each of the motors 822, 822', 822'', etc. of th antenna arrays 811, 811', 811'' is governed by a synchronizing device 823 so that the aerial-carrying arms 815, 815', 815'', etc. rotate uniformly at the same speed and remain constantly parallel to one another.

The frequencies of the generators 818, 818', 818'', of the order of one or some ten gigahertz, may be identical or close to one another so as to lie in a narrow frequency range.

The power of each transmitter advantageously varies in accordance with a predetermined law, a transmission rhythm then being characteristic of a beacon, as is the case in some marine light beacons.

The rate of rotation of the aerial arms may be comparatively slow, of the order of a few revolutions per second.

The arms may be several meters long.
The signal radiated by one aerial is of the form:

$$a \cos (\omega + \phi_1) \quad (64)$$

The signal radiated by the diametrally opposite aerial is of the form:

$$a \cos (\omega t + \phi_2) \quad (65)$$

In these equations:
$a$ is an amplitude;
$\omega$ is the angular frequency corresponding to the frequency of radiation transmitted by the aerial;

$t$ is the time;
$\phi_1$ is a phase angle with respect to the origin;
$\phi_2$ is another phase angle.

On board the aircraft A is a receiver, shown in FIG. 22, and the signal picked up by the airborne aerial 834 from the first-mentioned ground aerial is of the form:

$$\Sigma a_i \cos\left[\omega\left(t - \frac{r_i}{i}\right) + \phi_i + \phi_1\right] \quad (66)$$

The signal derived from the energy radiated by the second ground aerial and picked up by the aerial 834 has the form:

$$\Sigma a_i \cos\left[\omega\left(t - \frac{r_i}{i}\right) - \phi_i + \phi_2\right] \quad (67)$$

In these equations:
$a$ is an amplitude;
$\omega$ is the angular frequency of the energy applied to the aerials 813 and 814;
$t$ is the time;
$r$ is the distance of the phase center of the receiving aerial aboard the aircraft from the center 815 of the ground-station array device 811;
$i$ is a suffix identifying one of a multiplicity of equal paths which the radiation may follow to reach the aerial of the aircraft;
$\psi_1$ is given by the following formula:

$$\phi_i = \frac{2\pi R}{\lambda} \cos \Phi_i \cos (\Omega t - \theta_i) \quad (68)$$

wherein:

$R$ is the radius of rotation of the aerials;
$\lambda$ is the wavelength corresponding to the transmission frequency;
$\Phi$ is the angle of elevation or of sight of the aircraft as viewed from the center 815;
$\Omega$ is the speed of rotation of the arm 815;
$\theta$ is the azimuth angle, that is to say the angle which the vertical plane passing through the aircraft and through the center 815 forms with True North.

The receiver on board the aircraft has a reception band which is sufficiently wide to receive the signals transmitted by several antenna arrays distributed on the ground territory and operating on identical or neighboring carrier frequencies.

The signals received by the aerial 834 of the aircraft receiver are of the form:

a. for the signals coming from the array 811:

$$s(t) = a\left\{\cos\left[\omega\left(t - \frac{r}{c}\right) + \phi_1 + \phi_1\right] + \cos\left[\omega\left(t - \frac{r}{c}\right) + \phi_2 + \phi_2\right]\right\} \quad (69)$$

b. for those coming from the array 811':

$$s'(t) = a'\left\{\cos\left[\omega'\left(t - \frac{r'}{c}\right) + \phi'_1 + \phi'_1\right] + \cos\left[\omega'\left(t - \frac{r'}{c}\right) + \phi'_2 + \phi'_2\right]\right\} \quad (70)$$

c. for those coming from the array 811'':

$$s''(t) = a''\left\{\cos\left[\omega''\left(t - \frac{r''}{c}\right) + \phi''_1 + \phi''_1 + \cos \omega''\left(t - \frac{r''}{c}\right) + \phi''_2 + \phi''_2\right]\right\} \quad (71)$$

All the signals are applied to the input 833 of a frequency changer or mixer 832 (FIG. 22) also receiving oscillations furnished by the local oscillator 835 of angular frequency $\omega'$. The frequency changer 832 is followed by an I.F. amplifier 836 working into a detector device 831, which in turn is followed by a low-pass filter 837. At the output 838 of the filter there appears a low-frequency signal $S(t)$ of the form:

$$S(t) = \frac{a^2}{2} \cos(\phi_1 - \phi_2 + \phi_1 - \phi_2) + \frac{a'^2}{2} \cos(\phi'_1 - \phi'_2 + \phi'_1 - \phi'_2)$$

$$+ aa'\left\{\cos\left[\omega - \omega')t - \left(\frac{\omega r}{c} - \frac{\omega' r'}{c}\right) + \phi_2 - \phi'_1 + \phi_2 - \phi'_1\right]\right.$$

$$+ \cos\left[(\omega - \omega')t - \left(\frac{\omega r}{c} - \frac{\omega' r'}{c}\right) + \phi_1 + \phi'_2 + \phi_1 - \phi'_2\right]\right\} \quad (72)$$

$$+ aa'' [\cos [\ldots] + \cos [\ldots]]$$

$$+ a'a'' [\cos [\ldots] + \cos [\ldots]]$$

Each antenna array comprises two diametrally opposite aerials, with $$R_1 = R_2$$

and hence $$\psi_1 = -\psi_2 = \psi$$

In the same way, since $R'_1 = R'_2$, $\psi'_1 = -\psi'_2 = \psi'$

The radio-electric lengths of the directional coupler 821 are chosen so that:

$$\phi_1 - \phi_2 = \phi'_1 - \phi'_2 = \phi''_1 - \phi''_2 = \ldots = \phi$$

wherefore $$S^2(t) = \frac{a^2}{2} \cos(\phi + 2\phi) + \frac{a'^2}{2} \cos(\phi + 2\phi') + \frac{a''^2}{2} \cos(\phi + 2\phi'')$$

$$+ 2aa' \cos\left[(\omega - \omega')t - \left(\frac{\omega r}{c} - \frac{\omega' r}{c}\right) + \frac{\phi_1 + \phi_2 - (\phi'_1 + \phi'_2)}{2} \cos(\phi + \phi + \phi')\right] \quad (73)$$

$$+ 2aa'' \cos [\ldots]$$

$$+ 2a'a'' \cos [\ldots]$$

By choosing the frequencies of the generators 818, 818', 818'', etc. sufficiently near to one another, the signal emitted by the frequency changer 832, whose input 833 is connected to the airborne aerial 834 and which is also connected to the local oscillator 835, is contained in a frequency range which is sufficiently narrow to be isolated by a filter whose bandwidth is of the order of a few kilohertz, for example 5kHz.

Satisfactory functioning is ensured with a precision of operating frequency of generator 818 of the order of $10^{-7}$.

The signal $S^2(t)$ serves to energize an electro-luminescent diode 841. The beam delivered by the diode passes through a disc 842 with parallel stripes whose law of transparency variation along a direction 843 satisfies the formula:

$$T'(t, \rho', \theta') = 1 + \cos \phi_0 + \frac{2\pi_0}{\Lambda} \cos(\Omega t - \Phi_0) \quad (74)$$

The transmissivity of the disc 842 is uniform along a direction 844 perpendicular to the direction 843. Such a disc, like its counterparts illustrated in preceding Figures, is obtained by photographic reproduction of interference fringes produced by monochromatic light. The disc 842 is keyed to a shaft 845 driven by a motor 846 at the same speed $\Omega$ as the aerials of the rotating array 811.

In equation (74):
$\phi_0$ is a phase with respect to an origin;
$\Lambda$ is the spatial wavelength of the stripe pattern
$\rho_0, \theta_0$ are the polar co-ordinates of a point of the disc 842.

Suitable adjustment of the ground array yields:

$$\phi_1 - \phi_2 = \pi/4$$

Thus, the operating frequencies of the two aerials are of the same magnitude but in quadrature with each other.

By adjusting the intersection of the axis 845 with the pattern carried by the disc 842 there is obtained:

$$\phi_0 = \pi/4$$

The double-modulated beam, having passed through the disc 842, falls on the screen 851 of a vidicon which acts as an integrator. On the display screen there appear bright dots surrounded by concentric circles which are the images of the transmitting stations 811, 811', 811'', and which enable the crew of the aircraft to establish its position.

The disc 842 effects the correlation between the phase modulations of the signals $S^2(t)$ conveyed by the luminous flux of the electro-luminescent diode 841 and the modulation introduced by the law of transparency variation of the disc 842.

Integration ensures that only the modulations corresponding to the real paths between the beacons and the aircraft are retained, regardless of whether these paths are direct or result from a reflection on an obstacle. The components of phase modulation corresponding to different paths are eliminated.

The image on the screen 851 has the shake schematically shown in FIG. 23. It provides all the elements necessary for finding or recording a position, especially giving the azimuth angles under which the various beacons are observed.

The amplitude modulation of the energy radiated by the beacons enables the images on the screen to be identified.

From these images it is possible, by geometric construction, to pinpoint the position of the aircraft on the screen. Since the geographic sites of the beacons are known, direction of the True North can be determined therefrom.

It is now possible to control the motor driving the disc 842, for example with the aid of an adjustable phase shifter, so that the origin direction on the screen of the oscilloscope associated with the vidicon coincides with geographic North. In this condition the rotation of the disc 842 is not only isochronous but also synchronous with that of the arms carrying the aerials.

The direction-finding installation according to my invention is advantageously combined with a system of assisted landing comprising, at the airfields, aerial arrays carried by rotating arms and radiating ultra-high frequencies each distinguished by a low-frequency component from the ultra-high frequency transmitted by another such array and obtained from one or more low-frequency reference oscillations controlling also the movement of the rotating arms. The reconstruction of the reference oscillations aboard the aircraft is then directly obtained from the shaft of the motor driving the modulator disc whose rotary movement is synchronous with that of the arms of the ground-station aerial assembly. Ground-station antenna arrays intended to facilitate landings will rotate either at the same rate as the aerials for navigation, or at a rate which is an integral multiple thereof.

FIG. 24 illustrates the ground equipment at an airfield having two landing runways 411 and 412. At the intersection 413 of the centerlines 414 and 415 of the two runways there is placed a first antenna 416 comprising at its center 413 a stationary vertical aerial 417 (FIG. 23) and an aerial 418 orbiting with a uniform circular movement as schematically indicated at 419 at FIG. 25, around the center 413.

The source of radiation may be formed by a vertical dipole the radiation diagram of which is omnidirectional in the horizontal plane.

Instead of being formed by a single quarter-wave dipole, the aerial may be formed by a vertical stack of three or four vertical half-wave dipoles excited in phase, which ensures a certain directionality in the vertical plane.

The aerial 418 may be linear or more or less punctiform, as is schematically shown at 421, and in the same way the aerial 417 may be linear or more or less punctiform, as is schematically shown at 422. In the case of a punctiform such source 421 a plurality of radiation sources will be disposed along the circle 419 and electronic switching means will render them successively operative. Such an aerial array can then be disposed close to the ground and will thus not form an obstacle for taxiing or landing aircraft.

Both the stationary radiating source and the orbiting radiating source may be quasi-omnidirectional. They may alternatively transmit with a certain directivity as, for example, in the case of the configuration shown in FIG. 24 at an angle which is schematically indicated by the straight lines 423 and 424.

As already described, the two-dimensional movement of the radiating source in its plane causes variation, in a periodic manner for an outside object, of two angular parameters of location, such as the azimuth angle and the elevation angle, in a system of co-ordinates whose center is the center of rotation of the array.

The Doppler effect for a receiver of radiation transmitted by the aerial assembly, for example an aircraft receiver, resulting from the rotation of the source of radiant energy may then provide data relating to these two angular values.

Near the end 425 of the runway 411 there is provided a further antenna array 426 similar to the array 416, but the plane of the orbit 419$_1$ of array 426 is vertical instead of horizontal. An array 427, whose orbit 419$_2$ also lies in a vertical plane, is provided at the end 428 of the other runway 412.

For an aircraft receiving the radiation transmitted by the aerial assembly 416, the movement of the source 421 along orbit 419 gives rise to both azimuthal and elevational variations in the relative spatial position. For the array 416 with horizontal orbit 419 the variations in azimuth predominate. For the arrays 426 and 427 it is the variations of angle of elevation which are especially apparent.

In the installation shown schematically in FIGS. 26 and 27 the airfield is equipped with a single antenna array 431 whose orbit 419 lies in a plane which is inclined by 45° relative to the mean longitudinal vertical plane of the runway. In the course of the rotation of the array the azimuthal and elevational parameters of the aircraft vary by similar orders of magnitude.

Figure 28:
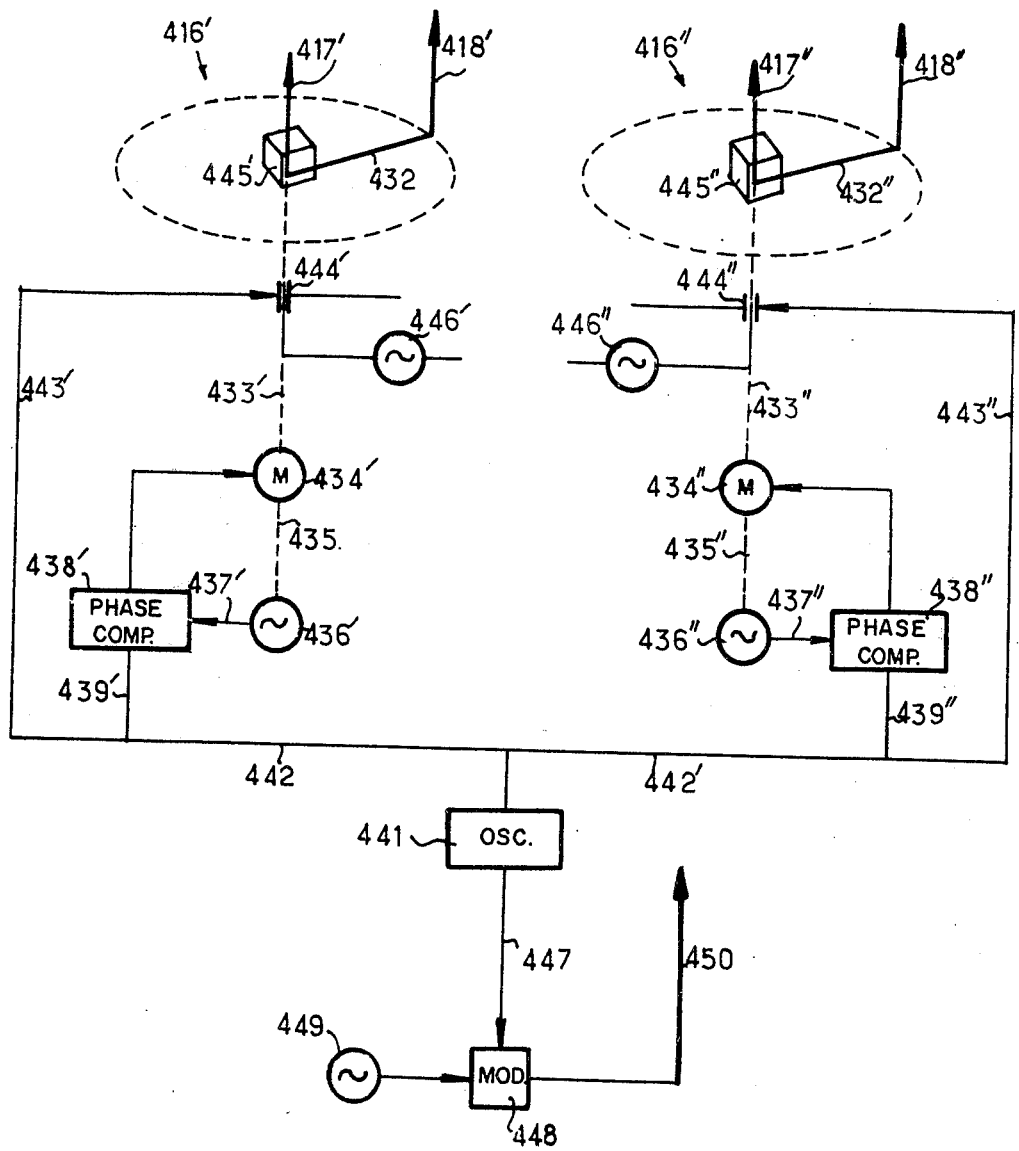
FIG. 28 is a schematic view of an installation comprising two antenna arrays and an energizing circuits therefor.

The airfield installation shown in FIG. 28 comprises a first aerial assembly 416' with a central stationary aerial 417' and an aerial 418' which orbits around the central aerial to generate a cylindrical surface coaxial with aerial 417'. A second, similar aerial assembly 416" is provided and the aerial assemblies are, for example, set up at respective landing runways. The aerial pairs 417', 418' and 417", 418" are interconnected by a respective rotating arm 432' and 432".

Each arm 432', 432" is connected to the shaft 433', 433" of an electric motor 434', 434" which also drives via a shaft 435', 435" a generator 436', 436" of periodic oscillations which are applied via a conductor 437', 437" to a phase comparator 438', 438". The comparator receives at its other input 439', 439" a reference frequency provided by a generator 441 for modulating periodic oscillations, the generator 441 having outputs 442' and 442" which separate into two routes 439' and 439" and conductors 443', 443" which terminate in shoes 444', 444".

By virtue of this arrangement the arms 432' and 432" and thus the mobile aerials 418' and 418" can rotate with strictly synchronized movements, always remaining parallel to one another, and at a uniform angular velocity equal to the angular frequency of the oscillation supplied by the generator 441.

The oscillations fed to the shoes 444' and 444" are introduced into respective modulators 445' and 445", rotating with the respective arms 432' and 432" where they amplitude-modulate a carrier frequency supplied by a U.H.F. generator 446' and 446", respectively. Means are provided for phase locking the carrier waves, which may have U.H.F. frequencies of different magnitudes.

For a receiver intercepting the signals transmitted by an aerial assembly which is driven and energized as described above, the phase modulation of the received signals results solely from the Doppler effect due, on the one hand, to the orbiting movement of the mobile aerial and, on the other hand, to the movement of the aircraft in which the receiver is installed.

A second output 447 of the generator 441 is connected to the modulation input of a modulator 448 and modulates a carrier wave supplied by an U.H.F. generator 449. The modulated U.H.F. is radiated by a reference aerial 450.

The energy radiated by the aerial 450 thus has a modulation which has a phase relation to the signals transmitted by the devices 416' and 416" that can be altered only by the Doppler effect.

Figure 29:
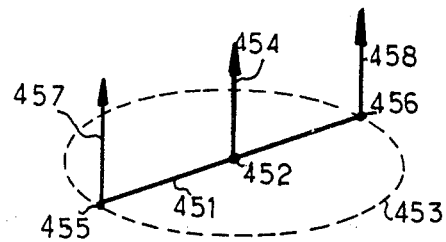
FIG. 29 is a schematic perspective view of a modified antenna array.

In the embodiment shown in FIG. 29 the aerial assembly comprises an arm 451 which rotates about its center 452 in a plane 453. The arm carries at that center 452 a first, non-orbiting aerial 454 and at its ends 455 and 456, equidistant from the center 452, respective aerials 457 and 458.

The phase modulations introduced by the movements of the rotating arm 451 are thus inverted for the aerials 457 and 458.

The carrier frequencies transmitted by the aerials 457 and 458 are different from one another but relatively close and also close to the carrier frequency transmitted by the aerial 454, so as to permit an easy reception while still distinguishing the signals corresponding to the various aerials.

Figure 30:
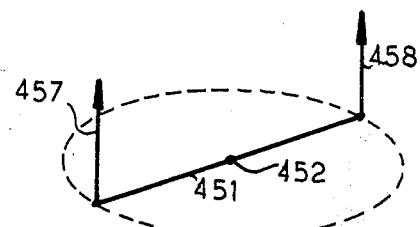
FIG. 30 is a view similar to that of FIG. 29 but for another variant.

In the embodiment shown in FIG. 30 the aerial assembly comprises only two orbiting aerials 457 and 458 mounted at the ends of the arm 451. It is devoid of a central aerial.

Figure 31:
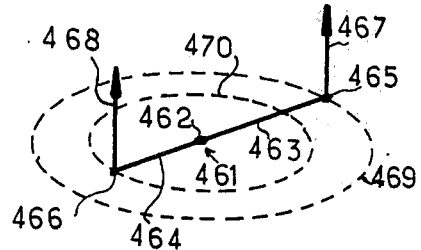
FIG. 31 is a view similar to the two preceding ones but for yet another variant.

In the embodiment shown in FIG. 31 the aerial assembly comprises an arm 461 mounted for rotation about a point 462 which separates two arms 463 and 464 of unequal lengths at whose ends 465 and 466 there are mounted two aerials 467 and 468 aerial 467 describing an orbit 469 of larger diameter than the orbit 470 described by aerial 468.

Reference is now made to FIG. 32. In this embodiment the orbiting aerial 481 is formed by a source transmitting a horizontally polarized radiation while having an omnidirectional radiation diagram in the horizontal plane. The aerial 481, which is of flat shape, is carried by a pulley 482 mounted for free rotation about its center 483 near the end of an arm 484 which rotates in a uniform movement about the axis 485. Centered on that with axis is a stationary, nonrotatable pulley 486 embraced by a belt 487 which also passes around the orbiting pulley 482. By virtue of this arrangement the aerial 481 remains oriented parallel to itself during its orbiting movement schematically indicated by the circular path 488 swept by its midpoint. This prevents major variations in the phase of radiation transmitted by the aerial as would occur with an aerial integral with the rotating arm which carries it.

Such an arrangement may be advantageous in the case of a source of directional transmission; although its phase center describes a continuous curve, the aerial illuminates the same portion of space.

Such a constant-orientation characteristic is as applicable to an antenna array rotating in a horizontal plane as to one rotating in a vertical or inclined plane.

The various described arrays may be employed exclusively for transmission or reception or successively for transmission and reception.

They may form part of a stationary apparatus such as the radio or radar equipment of an airport, of of a mobile ground station.

I claim:

1. A method of obtaining information on the position of a first station relative to a second station, comprising the steps of:
   sending out wave energy from a transmitting device at said first station;
   intercepting said wave energy by a receiving device at a second station;
   subjecting one of said devices to a continuous periodic motion;
   deriving from the intercepted wave energy a periodic signal component dependent on two spatial coordinates determined by said relative position;
   modulating a luminous flux with said signal component;
   directing the modulated flux onto an optical filter with a two-dimensional transmissivity pattern varying periodically in one dimension; and
   displacing said pattern with reference to the path of said modulated flux with a periodicity related to the period of said continuous motion whereby the intensity of the flux downstream of said pattern reaches an extreme value at a location determined by said spatial coordinates.

2. A method as defined in claim 1, comprising the further step of visualizing said location on a display surface.

3. A method as defined in claim 2 wherein the step of visualizing said location includes integrating the flux downstream of said pattern over a limited period.

4. A method as defined in claim 1 wherein said one of said devices and said pattern are rotated in synchronism with each other.

5. A method as defined in claim 4 wherein said receiving device is the one subject to said periodic motion, comprising the further step of conveying synchronizing information from the first station to the second station by corotating at least two wave sources forming part of said transmitting device.

6. A method as defined in claim 5 wherein said wave sources are radiators of high-frequency wave energy rotating about a common axis.

7. A method as defined in claim 6 wherein the waves emitted by the rotating radiators are generated by modulating a high-frequency carrier with low-frequency oscillations whose pulsatances are harmonically related to the angular velocity of said radiators.

8. A method as defined in claim 4 wherein said pattern is formed on a disc by photographic reproduction of interference fringes.

9. A method as defined in claim 4 wherein said pattern is rotated about an axis offset from its geometrical center.

10. A method as defined in claim 1 wherein the first station is on the ground and the second station is airborne, the device subjected to said periodic motion being located at said first station.

11. A method as defined in claim 10 wherein the first station is one of several substantially identical radio beacons with transmitting devices sending out radio waves in a narrow frequency range, the optically filtered fluxes associated with said radio waves being visualized at the airborne second station to display the locations of said beacons.

12. A method as defined in claim 10 wherein said receiving device is the one subjected to said periodic motion, comprising the further steps of sending out periodic interrogation pulses from the first station to the second station and using incoming response pulses from said second station at said first station to modulate said luminous flux.

13. A method of obtaining information on the position of aircraft in the vicinity of a landing site, comprising the steps of:
   sending out high-frequency radiant energy from an aircraft approaching said landing site;
   intercepting said radiant energy at said landing site by two receiving aerials corotating about a common axis;
   deriving from the outputs of said aerials a periodic signal component dependent on two spatial coordinates determined by the position of the aircraft;
   modulating a luminous flux with said signal component;
   directing the modulated flux onto an optical filter with a two-dimensional transmissivity pattern varying periodically in one direction; and
   rotating said pattern in a plane transverse to the path of said modulaed flux in synchronism with said corotating aerials whereby the intensity of the flux downstream of said pattern reaches an extreme value at a location determined by said spatial coordinates.

14. A method as defined in claim 13, comprising the further step of transmitting periodic interrogation pulses from the landing site, said radiant energy being sent out by the approaching aircraft in the form of a train of response pulses.

15. A method as defined in claim 13, comprising the further step of transmitting data on said spatial coordinates to the approaching aircraft.

16. A system for obtaining information on the position of a first station relative to a second station, comprising:

wave-transmission means including a transmitting device at said first station;

wave-reception means including a receiving device at said second station;

drive means for subjecting one of said devices to a continuous periodic motion;

demodulating means connected to said receiving device for deriving from intercepted wave energy, originating at said transmitting device, a periodic signal component dependent on two spatial coordinates determined by said relative position;

photoelectric transducer means at said second station connected to said demodulating means for generating a luminous flux modulated with said signal component;

optical filter means in the path of said flux having a two-dimensional transmissivity pattern varying periodically in one dimension; and mechanism for displacing said pattern with reference to the path of said modulated flux with a periodicity related to the period of said continuous motion whereby the intensity of said flux downstream of said pattern reaches an extreme value at a location determined by said spatial coordinates.

17. A system as defined in claim 16, further comprising display means at said second station positioned in the path of said flux downstream of said filter means.

18. A system as defined in claim 17 wherein said display means comprises a vidicon camera coupled to an oscilloscope.

19. A system as defined in claim 17 wherein said display means includes integrating means for averaging said flux over a limited period.

20. A system as defined in claim 16 wherein said one of said devices is an aerial rotating about an axis, said optical filter means comprising at least one rotatable correlating disc.

21. A system as defined in claim 20 wherein said aerial is said receiving device, said mechanism comprising a mechanical link between said aerial and said correlating disc.

22. A system as defined in claim 20 wherein said aerial is said transmitting device, further comprising synchronizing means for keeping said correlating disc in step with said aerial.

23. A system as defined in claim 22 wherein said aerial is part of a rotatable antenna array including a plurality of corotating aerials with different operating frequencies separated from a common high-frequency carrier by low modulating frequencies whose pulsatances are harmonically related to the angular velocity of said array, said synchronizing means including a coincidence detector at said second station connected to said demodulating means for ascertaining a predetermined phase relationship of said modulating frequencies.

24. A system as defined in claim 23 wherein said mechanism comprises a motor coupled with said correlating disc, said synchronizing means further including a feedback-pulse generator coupled with said motor and servo means connected to said detector and to said generator for controlling said motor to maintain substantial coincidence between said feedback pulses and the instances of occurrence of said predetermined phase relationship.

25. A system as defined in claim 24 wherein said feedback-pulse generator comprises a disc member with a plurality of coaxial annular zones divided into alternately optically transmissive and nontransmissive sectors.

26. A system as defined in claim 20 wherein said pattern consists of a multiplicity of alternately light-transmissive and light-nontransmissive parallel stripes carried on said correlating disc and extending parallel to a diameter thereof.

27. A system as defined in claim 26 wherein said stripes conform to a sinusoidal law of transmissivity in a direction transverse to said diameter.

28. A system as defined in claim 26 wherein said mechanism comprises a motor coupled with said disc, said demodulating means including a pair of disc members coupled with said motor for rotation in synchronism with said correlating disc, said disc members being provided with respective sets of parallel stripes of alternately light-transmitting and light-nontransmitting character, said sets being mutually identical but relatively offset from the center of disc rotation, and photoelectric means coacting with said disc members for generating a pair of quadrature signals.

29. A system for obtaining information on the position of aircraft relative to a ground station, comprising:

first antenna means at said ground station including at least one aerial spaced from an axis;

drive means for rotating said aerial about said axis;

an airborne station aboard an aircraft provided with second antenna means;

oscillator means connected to one of said antenna means for transmitting high-frequency radiant energy;

demodulating means connected to the other of said antenna means for deriving from an output thereof a periodic signal component dependent on two spatial coordinates determined by the position of the aircraft;

photoelectric transducer means connected to said demodulating means for generating a luminous flux modulated with said signal component;

optical filter means in the path of said flux having a two-dimensional transmissivity pattern varying periodically in one dimension; and mechanism for rotating said pattern in a plane transverse to said path in synchronism with said aerial whereby the intensity of said flux downstream of said pattern reaches an extreme value at a location determined by said spatial coordinates.

30. A system as defined in claim 29 wherein said first antenna means comprises at least one rotating antenna array, said array including said aerial and a diametrally opposite aerial corotating therewith.

31. A system as defined in claim 30 wherein said corotating aerials are spaced at different distances from said axis.

32. A system as defined in claim 30 wherein said corotating aerials are connected to said oscillator means for receiving therefrom respective operating frequencies differing from a common high-frequency carrier by low modulating frequencies whose pulsatances are harmonically related to the angular velocity of said array.

33. A system as defined in claim 30 wherein said array includes a further aerial aligned with said axis and connected to said oscillator means for receiving said carrier therefrom.

34. A system as defined in claim 30 wherein said corotating aerials are connected to said oscillator means for receiving therefrom respective operating frequencies of identical magnitudes in quadrature with each other.

35. A system as defined in claim 29 wherein said spatial coordinates are an azimuthal angle and an elevational angle, said axis being inclined to the horizontal in a direction making said periodic signal component substantially equally dependent on both said spatial coordinates.

36. A system as defined in claim 29 wherein said aerial has a flat body with major surfaces substantially parallel to said axis, said drive means including a linkage engaging said aerial for holding said body parallel to itself during rotation thereof.

37. A system as defined in claim 29 wherein said oscillator means is a pulse generator connected to said second antenna means, said demodulating means being energized by said first antenna means.

38. A system as defined in claim 37 wherein said ground station is provided with clock means for sending out interrogation pulses adapted to activate said pulse generator aboard an aircraft equipped with said airborne station, said ground station further including gate means controlled by said clock means for connecting the output of said first antenna means to said demodulating means only during a limited interval following each interrogation pulse.

39. A system as defined in claim 39, further comprising integrating display means positioned to intercept said flux downstream of said filter means.

40. A system as defined in claim 39 wherein said display means comprises a vidicon camera and an oscilloscope connected thereto, said oscilloscope being provided with a viewing screen.

41. A system as defined in claim 40, further comprising a grating interposed between said filter means and said vidicon camera.

42. A system as defined in claim 40, further comprising background-control means connected to said oscilloscope for suppressing a continuous component of said flux in the display of said viewing screen.

* * * * *